(12) United States Patent   (10) Patent No.: US 8,976,884 B2
Krishnamurthy et al.   (45) Date of Patent: Mar. 10, 2015

(54) METHOD AND APPARATUS FOR ANTENNA ARRAY CHANNEL FEEDBACK

(71) Applicant: Motorola Mobility LLC, Libertyville, IL (US)

(72) Inventors: Sandeep H. Krishnamurthy, Mountain View, CA (US); Tyler A. Brown, Mundelein, IL (US); Colin D. Frank, Park Ridge, IL (US); Robert T. Love, Barrington, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 22 days.

(21) Appl. No.: 13/722,148

(22) Filed: Dec. 20, 2012

(65) Prior Publication Data

US 2014/0177745 A1   Jun. 26, 2014

(51) Int. Cl.
*H04B 7/02* (2006.01)
*H04B 7/04* (2006.01)
*H04B 7/06* (2006.01)

(52) U.S. Cl.
CPC .......... *H04B 7/0413* (2013.01); *H04B 7/0456* (2013.01); *H04B 7/0619* (2013.01); *H04B 7/063* (2013.01); *H04B 7/0634* (2013.01); *H04B 7/0647* (2013.01); *H04B 7/0639* (2013.01)
USPC .......... 375/267; 370/252; 370/253; 370/328; 370/329; 375/219; 455/450

(58) Field of Classification Search
None
See application file for complete search history.

(56) References Cited

U.S. PATENT DOCUMENTS

| 7,236,808 | B2 | 6/2007 | Goldberg |
| 8,432,828 | B2 | 4/2013 | Ihm et al. |
| 8,665,984 | B2 | 3/2014 | Mazzarese et al. |
| 8,750,251 | B2 | 6/2014 | Shin et al. |

(Continued)

FOREIGN PATENT DOCUMENTS

| EP | 0647982 B1 | 10/2002 |
| EP | 2395692 A1 | 12/2011 |

(Continued)

OTHER PUBLICATIONS

Per Zetterberg, "Performance of Antenna Tilting and Beamforming in an Urban Macrocell", KTH Report 2009 16 (http://www.ee.kth.se/php/modules/publications/reports/2009/IR-EE-SB_2009_016.pdf).

(Continued)

*Primary Examiner* — Adolf Dsouza
(74) *Attorney, Agent, or Firm* — Faegre Baker Daniels LLP

(57) ABSTRACT

A method and apparatus provide antenna array channel feedback. The method can include receiving a first set of channel state information reference signals on resource elements, and a second set of channel state information reference signals on resource elements. The method can include determining a first precoding matrix based on the received first set of channel state information reference signals. The first precoding matrix can be chosen from a first codebook. The method can include determining a second precoding matrix based on the second set of channel state information reference signals. The second precoding matrix can be chosen from a second codebook that is different than the first codebook. The method can include transmitting a representation of at least one of the first precoding matrix and the second precoding matrix.

28 Claims, 8 Drawing Sheets

(56) References Cited

U.S. PATENT DOCUMENTS

| | | |
|---|---|---|
| 2010/0278278 A1 | 11/2010 | Lee et al. |
| 2010/0284351 A1 | 11/2010 | Liang et al. |
| 2011/0080969 A1 | 4/2011 | Jongren et al. |
| 2011/0150113 A1 | 6/2011 | Oyman et al. |
| 2011/0176442 A1 | 7/2011 | Ihm et al. |
| 2011/0216846 A1 | 9/2011 | Lee et al. |
| 2011/0249637 A1 | 10/2011 | Hammarwall et al. |
| 2011/0249712 A1 | 10/2011 | Hammarwall et al. |
| 2011/0249713 A1 | 10/2011 | Hammarwall et al. |
| 2011/0261897 A1 | 10/2011 | Jen et al. |
| 2011/0305263 A1 | 12/2011 | Jongren et al. |
| 2012/0003945 A1 | 1/2012 | Liu et al. |
| 2012/0076039 A1 | 3/2012 | Kwon et al. |
| 2012/0082042 A1 | 4/2012 | Lunttila et al. |
| 2012/0113830 A1 | 5/2012 | Zhu et al. |
| 2012/0140660 A1 | 6/2012 | Kang et al. |
| 2012/0201187 A1 | 8/2012 | Koo et al. |
| 2012/0207145 A1 | 8/2012 | Han et al. |
| 2012/0219042 A1* | 8/2012 | Onggosanusi et al. ....... 375/219 |
| 2012/0257531 A1 | 10/2012 | Ko et al. |
| 2012/0287799 A1 | 11/2012 | Chen et al. |
| 2012/0314590 A1 | 12/2012 | Choudhury et al. |
| 2013/0058386 A1 | 3/2013 | Mazzarese |
| 2013/0094380 A1 | 4/2013 | Taoka et al. |
| 2013/0148755 A1 | 6/2013 | Melzer et al. |
| 2013/0155973 A1 | 6/2013 | Geirhofer et al. |
| 2013/0250876 A1 | 9/2013 | Hugl et al. |
| 2013/0279628 A1 | 10/2013 | Mizuta et al. |
| 2014/0029684 A1 | 1/2014 | Shirani-Mehr et al. |
| 2014/0036796 A1 | 2/2014 | Etemad et al. |

FOREIGN PATENT DOCUMENTS

| | | |
|---|---|---|
| EP | 2482582 A1 | 8/2012 |
| WO | 2008034458 A1 | 3/2008 |
| WO | 2009061116 A2 | 5/2009 |

OTHER PUBLICATIONS

Tsakalaki et al., "Deterministic Beamforming for Enhanced Vertical Sectorization and Array Pattern Compensation," 6th European Conference on Antennas and Propagation (EUCAP), 2012.

Liu and Jafarkhani, "Transmit Beamforming for a Large Reconfigurable Antenna Array," IEEE Globecomm, 2005.

Koppenborg, Johannes et al.: "3D Beamforming Trials with an Active Antenna Array", Smart Antennas (WSA), 2012 International ITG Workshop on, Mar. 7-8, 2012, pp. 110-114.

Ericsson, St-Ericsson: "Refinements of Feedback and Codebook Design", 3GPP TSG-RAN WG1 #61, R1-10333, Montreal, Canada, May 10-14, 2010, all pages.

3GPP TR 37.840 V0.3.0, 3rd Generation Partnership Project; Technical Specification Group Radio Access Network; Study of AAS Base Station; (Release 11), 3GPP TSG-RAN WG4 Meeting #64bis, R4-12xxxxx, Santa Rosa, USA , Oct. 8-12, 2012, Agenda Item; y.y, all pages.

Samsung: "Technologies for Rel-12 and Onwards", 3GPP TSG RAN Workshop on Rel-12 and Onwards, RWS-120021, Ljblijana, Slovenia, Jun. 11-12, 2012, all pages.

Samsung: "Rel-12 and onward, WS on TD-LTE Enhancements & Evolution for Rel-12 and Beyond", Apr. 17, 2012, all pages.

Ericsson, Views on TD-LTE for Rel-12, TD-LTE workshop, LTE Enhancements and Evolution for Rel-12 and beyond workshop, Jun. 2012, all pages.

Alcatel-Lucent Shanghai Bell et al.: "Considerations on CSI Feedback enhancements for high-priority antenna configurations", 3GPP Draft; R1-112420 Considerations on CSI Feedback Enhancements for High-Priority Antenna Configurations Clean, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 18, 2011, all pages.

Patent Cooperation Treaty, International Search Report and Written Opinion of the International Searching Authority for International Application No. PCT/US2013/072724, Feb. 7, 2014, 16 pages.

Patent Cooperation Treaty, International Search Report and Written Opinion of the International Searching Authority for International Application No. PCT/US2013/072759, Mar. 25, 2014, 13 pages.

Patent Cooperation Treaty, International Search Report and Written Opinion of the International Searching Authority for International Application No. PCT/US2013/072730, Feb. 7, 2014, 32 pages.

Fodor, Gabor et al, "Design Aspects of Network Assisted Device-to-Device Communications", IEEE Communications Magazine, Mar. 2012, pp. 170-177.

Doppler, Klaus et al, "Device-to-Device Communication as an Underlay to LTE-Advanced Networks", IEEE Communications Magazine, Dec. 2009, pp. 42-49.

Lei, Lei et al., "Operator Controlled Device-to-Device Communications in LTE-Advanced Networks", IEEE Communications Magazine, Jun. 2012, pp. 96-104.

Ntt Docomo et al., "Rate maching parameters for CA", 3GPP TSG-RAN Meeting #65, R1-111863, 36.212 CR 0114, V10.1.0, Barcelona, Spain, May 9-13, 2011, all pages.

Alcatel-Lucent Shanghai Bell et al.: "Considerations on CSI Feedback enhancements for high-priority antenna configurations", 3GPP TSG-RAN WG1 #66, R1-112420, Athens, Greece, Aug. 22-26, 2011.

* cited by examiner

METHOD AND APPARATUS FOR ANTENNA ARRAY CHANNEL FEEDBACK

CROSS-REFERENCE TO RELATED APPLICATIONS

This application is related to an application entitled "Method and Apparatus for Antenna Array Channel Feedback," Motorola Mobility Ser. No. 13/722,077, and an application entitled "Method and Apparatus for Antenna Array Channel Feedback," Motorola Mobility Ser. No. 13/721,938, filed on even date herewith, commonly assigned to the assignee of the present application, and hereby incorporated by reference.

BACKGROUND

1. Field

The present disclosure is directed to a method and apparatus for channel feedback in a wireless system with antenna arrays. More particularly, the present disclosure is directed to feedback from a wireless terminal to a base station.

2. Introduction

A Multi-Input Multi-Output (MIMO) communication system uses a plurality of channels in a spatial area. Antenna arrays that have multiple transmission antennas can increase the capacity of data transmission through MIMO transmission schemes.

Two types of MIMO transmission schemes can be employed. Single-user MIMO (SU-MIMO) involves transmitting at least one data stream to a single user over a time frequency resource. Multi-user MIMO (MU-MIMO) involves transmitting at least one data stream per user to at least two co-scheduled users over a single, i.e., same time frequency, resource.

In a MIMO communication system, base stations and mobile stations use codebooks to enable channel state information feedback. The codebooks may additionally be used for precoding the information streams at the transmitter. Elements of a codebook are stored in the base stations and mobile stations and can be used to quantize the spatial channel state information for feedback. Each codebook element may be a vector or a matrix depending on the dimension of a channel matrix and the number of data streams that can be supported. Each mobile station selects one matrix or vector corresponding to channel information from among matrices or vectors included in the codebook according to a channel formed between the base station and the mobile station. Each base station uses a codebook to recognize channel information by receiving the matrix or vector selected by each mobile station. The selected matrix or vector may be used for beamforming or, more generally, precoding the one or more data streams prior to transmission by the base station using multiple antennas. Precoding is used to emit multiple data streams from the antenna array appropriate weightings such that the link throughput is maximized.

Typically, MIMO systems support a maximum of eight Channel State Information Reference Signal (CSI-RS) ports for determining channel state information feedback. However, base station antenna arrays may employ more than eight antenna elements, which exceed the number of CSI-RS antenna ports available for computing feedback at the wireless terminal. Furthermore, large antenna arrays may require additional Channel State Information (CSI) and precoding matrix signaling.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. These drawings depict only typical embodiments of the disclosure and are not therefore to be considered to be limiting of its scope.

DETAILED DESCRIPTION

Embodiments provide a method and apparatus for antenna array channel feedback. Embodiments can provide proper channel feedback for the number of beams that may be sent from a base station antenna array. Embodiments can also provide Channel State Information (CSI) and precoding matrix signaling for large antenna arrays.

According to one example embodiment, a method can include receiving, at a wireless terminal, a first set of channel state information reference signals on resource elements, and a second set of channel state information reference signals on resource elements. The method can include determining, by the wireless terminal, a first precoding matrix based on the received first set of channel state information reference signals; where the first precoding matrix is chosen from a first codebook. The method can include determining, by the wireless terminal, a second precoding matrix based on the second set of channel state information reference signals, where the second precoding matrix is chosen from a second codebook that is different than the first codebook. The method can include transmitting, by the wireless terminal, a representation of at least one of the first precoding matrix and the second precoding matrix.

According to another example embodiment, the method can include receiving, at a wireless terminal, a set of channel state information reference signals. The method can include determining, by the wireless terminal, based on the received set of channel state information reference signals, a precoding matrix that is a product of a first precoding matrix and a second precoding matrix. The first precoding matrix can have at least a representation in terms of a representation matrix, where the representation matrix can be based on a matrix selected from a first codebook. The second precoding matrix can be based on a second codebook. The method can include transmitting, by the wireless terminal, a representation of at least one of the first precoding matrix and the second precoding matrix.

According to another example embodiment, the method can include receiving, at a wireless terminal, a set of channel state information reference signals. The method can include determining, by the wireless terminal, a precoding matrix based on the received set of channel state information reference signals, where the precoding matrix has a representation in terms of three components. The first component of the three components can be determined from a first set of vectors. The second component of the three components can be determined from a first set of parameters. The third component of the three components can be determined from a second set of parameters, where the second set of parameters is a set of unit-magnitude scalars. The method can include transmitting, by the wireless terminal, a representation of at least one of the first component, the second component, and the third component.

Figure 1:
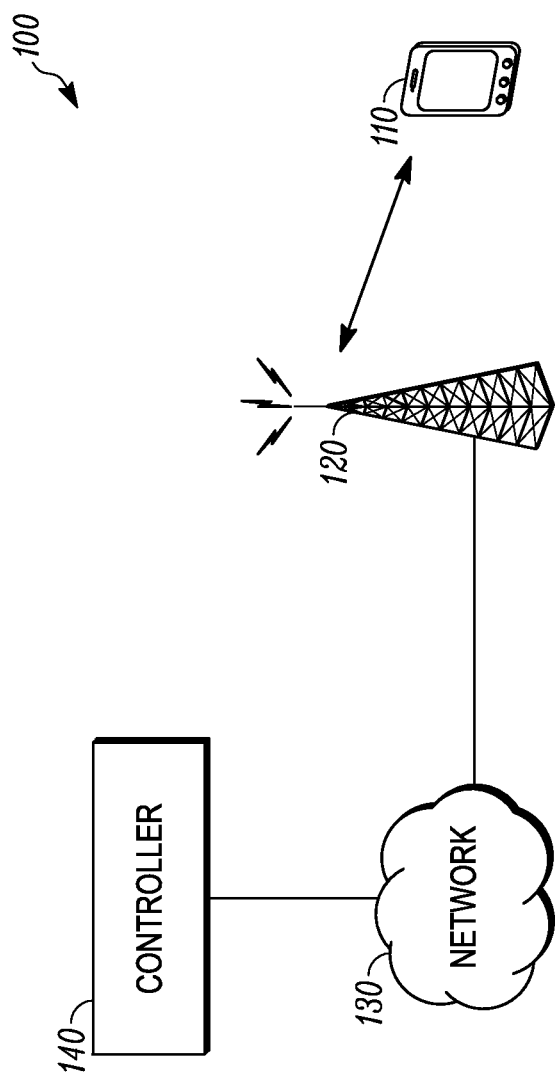
FIG. 1 is an example block diagram of a system according to a possible embodiment.

FIG. 1 is an example block diagram of a system 100 according to a possible embodiment. The system 100 can include a User Equipment (UE) 110, an eNodeB (eNB) 120, a network 130, and a network controller 140. The UE 110 may be a wireless terminal. For example, the UE 110 can be a wireless communication device, a wireless telephone, a cellular telephone, a personal digital assistant, a pager, a personal computer, a selective call receiver, a tablet computer, or any other device that is capable of sending and receiving communication signals on a network including a wireless network. The eNB 120 may be a base station. For example, the eNB 120 can be a cellular base station, an access point (AP), access terminal (AT), relay node, home eNB, pico eNB, femto eNB, Transmission Point (TP), or can be any other device that provides access between a wireless communication device and a network. The eNB 120 communicates with the terminal 110 using network 130 communication signals or other communication signals.

The network controller 140 can be connected to the network 130. The network controller 140 may be located at a base station, at a radio network controller, or anywhere else on the network 130. The network 130 may include any type of network that is capable of sending and receiving signals, such as wireless signals. For example, the network 130 may include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, and other communications systems. Furthermore, the network 130 may include more than one network and may include a plurality of different types of networks. Thus, the network 130 may include a plurality of data networks, a plurality of telecommunications networks, a combination of data and telecommunications networks and other like communication systems capable of sending and receiving communication signals.

Figure 2:
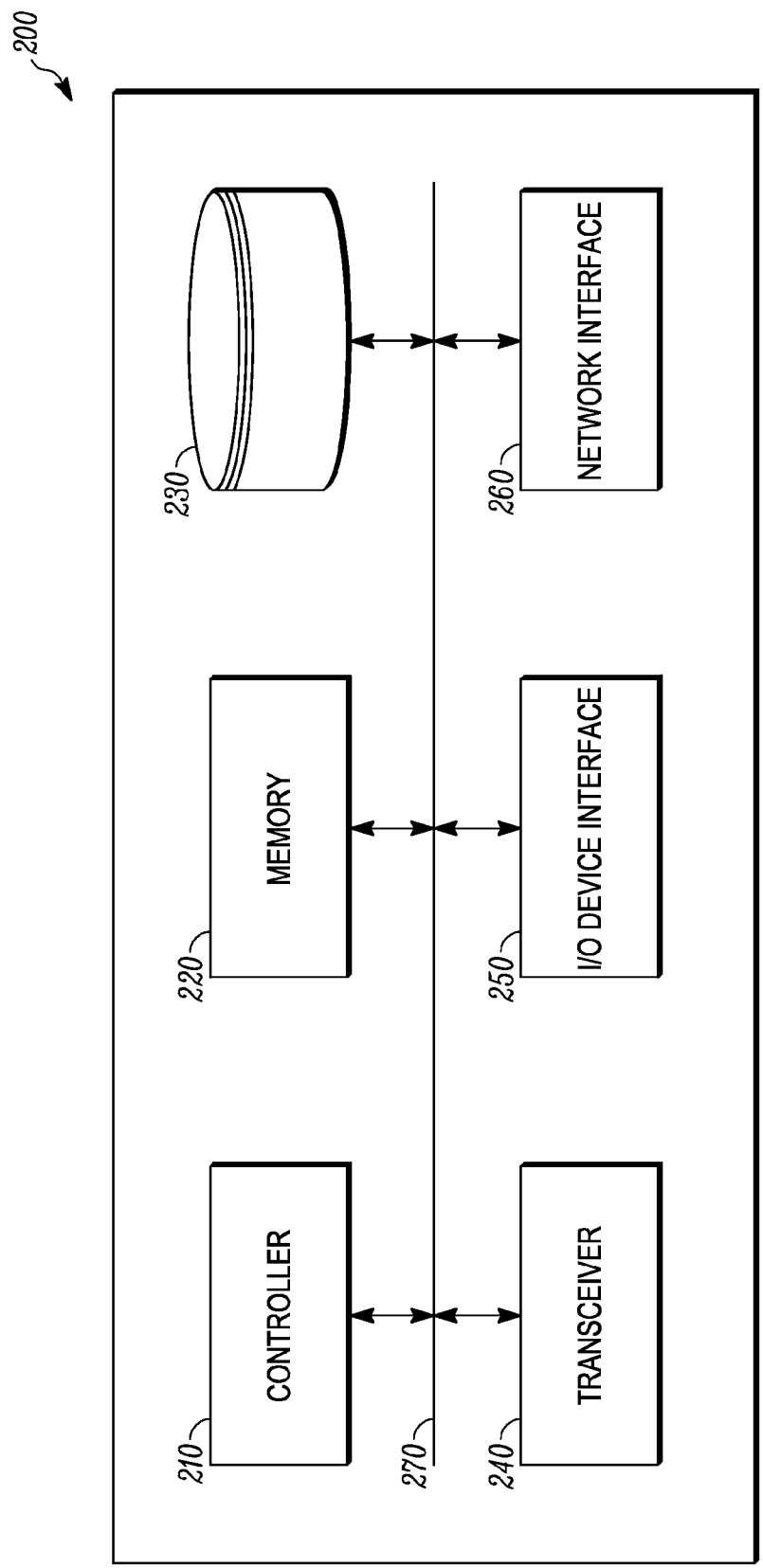
FIG. 2 is an example block diagram of a base station according to a possible embodiment.

FIG. 2 is an example block diagram of a base station 200, such as the eNB 120, according to a possible embodiment. The base station 200 may include a controller 210, a memory 220, a database interface 230, a transceiver 240, Input/Output (I/O) device interface 250, a network interface 260, and a bus 270. The base station 200 may implement any operating system, such as Microsoft Windows®, UNIX, or LINUX, for example. Base station operation software may be written in any programming language, such as C, C++, Java or Visual Basic, for example. The base station software may run on an application framework, such as, for example, a Java® server, a .NET® framework, or any other application framework.

The transceiver 240 may create a data connection with the terminal 110. The controller 210 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 210 may be any controller or processor device or devices capable of operating a base station and implementing the disclosed embodiments.

According to a possible implementation, the memory 220 includes volatile and nonvolatile data storage, including one or more electrical, magnetic, or optical memories, such as a Random Access Memory (RAM), cache, hard drive, or other memory device. The memory 220 may have a cache to speed access to specific data. The memory 220 may also be connected to a Compact Disc-Read Only Memory (CD-ROM), Digital Video Disc-Read Only memory (DVD-ROM), DVD read write input, tape drive, thumb drive, or other removable memory device that allows media content to be directly uploaded into a system. Data may be stored in the memory 220 or in a separate database. For example, the database interface 230 may be used by the controller 210 to access the database. The database may contain any formatting data to connect the terminal 110 to the network 130.

According to a possible implementation, the I/O device interface 250 is connected to one or more input and output devices that may include a keyboard, a mouse, a touch screen, a monitor, a microphone, a voice-recognition device, a speaker, a printer, a disk drive, or any other device or combination of devices that accept input and/or provide output. The I/O device interface 250 may receive a data task or connection criteria from a network administrator. The network connection interface 260 may be connected to a communication device, modem, network interface card, a transceiver, or any other device capable of transmitting and receiving signals to and from the network 130. The components of the base station 200 are connected via the bus 270, are linked wirelessly, or are otherwise connected.

Although not required, embodiments can be implemented using computer-executable instructions, such as program modules, being executed by an electronic device, such as a general purpose computer. Generally, program modules can include routine programs, objects, components, data structures, and other program modules that perform particular tasks or implement particular abstract data types. The program modules may be software-based and/or may be hardware-based. For example, the program modules may be stored on computer readable storage media, such as hardware discs, flash drives, optical drives, solid state drives, CD-ROM media, thumb drives, and other computer readable storage media that provide non-transitory storage aside from a transitory propagating signal. Moreover, embodiments may be practiced in network computing environments with many types of computer system configurations, including personal computers, hand-held devices, multi-processor systems, microprocessor-based or programmable consumer electronics, network personal computers, minicomputers, mainframe computers, and other computing environments.

Figure 3:
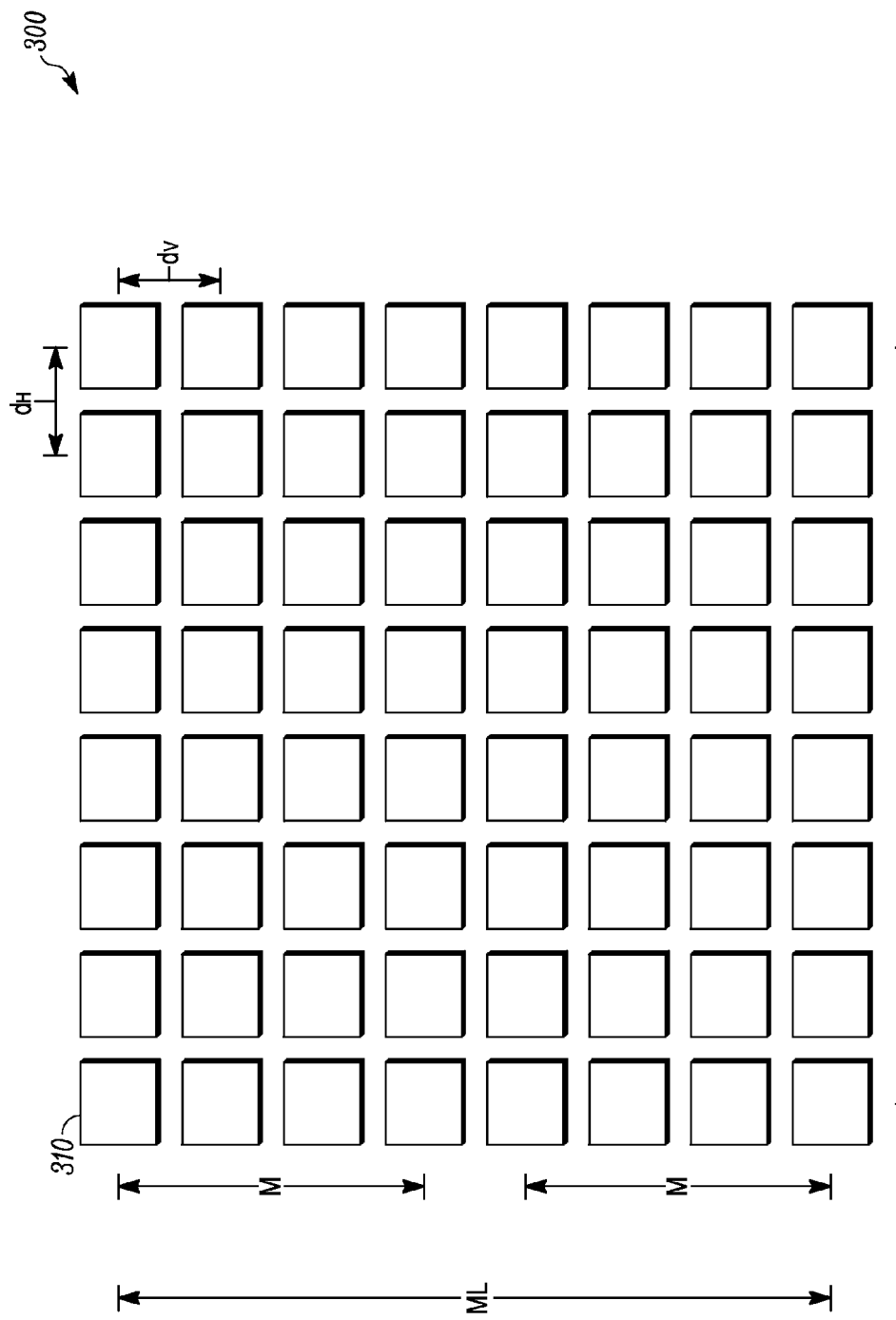
FIG. 3 is an example block diagram of an antenna array at a base station according to a possible embodiment.

FIG. 3 is an example block diagram of an antenna array 300 that can be used by the transceiver 240 at the base station 200, such as the eNB 120, according to a possible embodiment. The antenna array 300 can be a transmit antenna grid of $(ML) \times N$ antennas 310. For example, the antenna array 300 can include L ($L \geq 1$) vertical groups of M ($M>1$) antennas (a vertical subset array or vertical subarray) to create ML vertical antenna elements. The antenna array 300 can include $N(N>1)$ columns of ML vertical antenna elements. For example, for an 8×8 array case, ML=8 and N=8. Vertical inter-element separation is denoted by $d_V$ with for example $d_V \in \{0.5\lambda, 4\lambda\}$ and horizontal inter-element separation is denoted by $d_H$ with for example $d_H \in \{0.5\lambda, 4\lambda\}$, where $\lambda$ is the wavelength applicable to the center frequency of the LTE carrier or carrier frequency of the transmitted signal. The example antenna array 300 can be seen as comprising single (e.g., co-polarized) polarized antenna elements which can be considered as a uniform linear array in the horizontal and vertical dimensions. In another example, the antenna array can comprise dual-polarized or cross-polarized antenna elements. In one embodiment, subarrays (e.g., vertical group of M antenna elements) within the antenna array are formed such that within a sub-array, correlation is fairly large (e.g., antenna elements with the same polarization) with the correlation structure slowly varying in time. In contrast, the fading of the channels between the subarrays has low correlation with the relative phase between the subarrays' channels varying rapidly. The antenna array with dual-polarized or cross-polarized antenna elements can be considered in each dimension (horizontal or vertical) to include two (or more) co-polarized subarrays with each subarray as a uniform linear array. The eNB 120 can estimate an Angle of Departure (AoD) of a transmit signal and/or a terminal 110 coarse location with respect to the antenna array 300 based on a uplink Sounding Reference Signal (SRS) transmission or more generally, any uplink transmissions from the terminal 110 by leveraging uplink channel response reciprocity in TDD (Time Division Duplex) systems or multipath direction of arrival reciprocity in FDD (Frequency Division Duplex) systems. The antenna array 300 can be calibrated with respect to AoD, which can enable beamsteering in the direction of the terminal 110.

Figure 4:
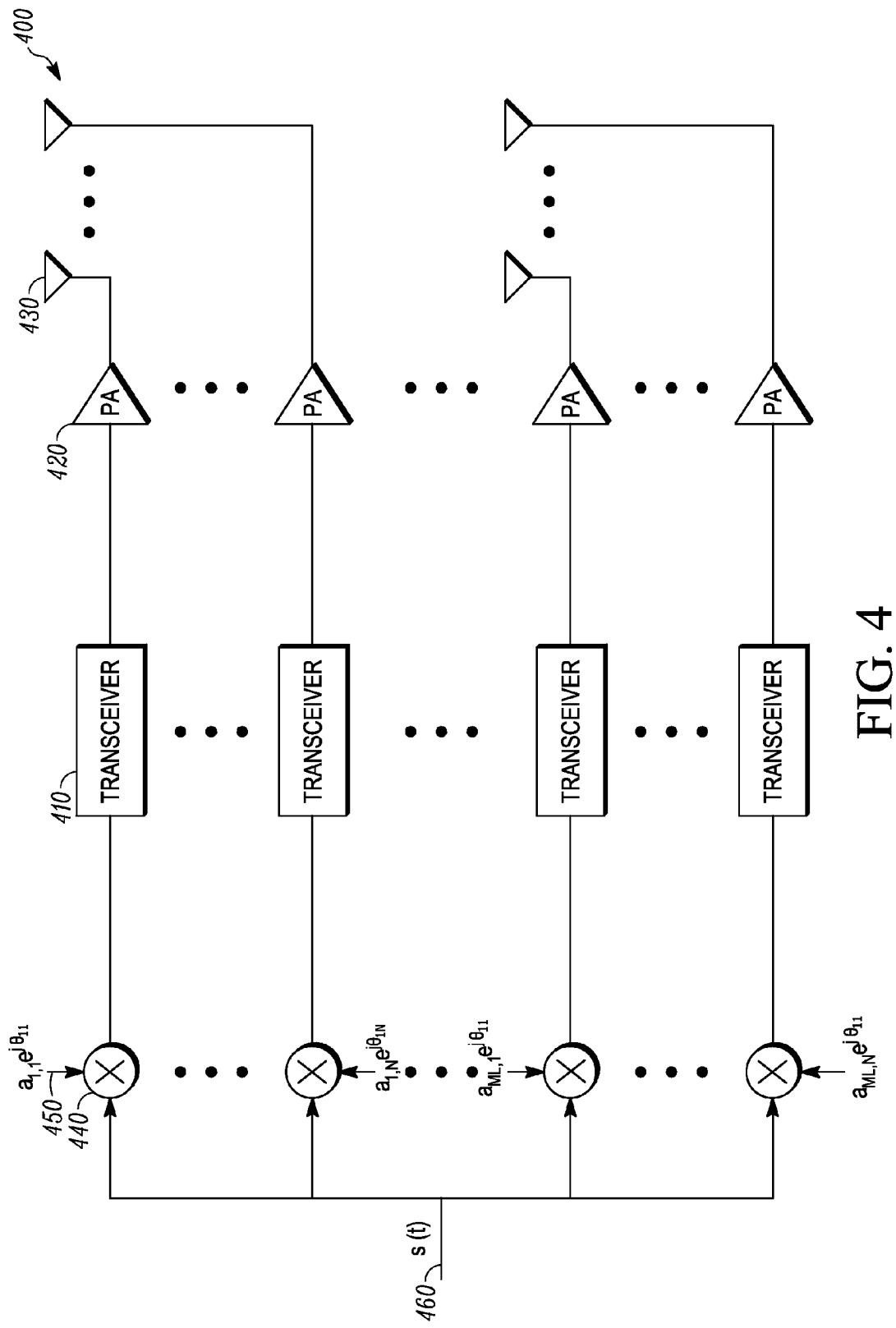
FIG. 4 is an exemplary block diagram of beamforming performed by a base station.

FIG. 4 is an exemplary block diagram 400 of beamforming performed by the eNB 120. The eNB 120 can communicate with the terminal 110 by transmitting and receiving signals using the antenna array 300 for beamforming in a manner to achieve channel requirements. The data stream 460 is spatial layer which includes a sequence of modulation symbols. The data stream 460 including the sequence of modulation symbols may be first multiplied in multipliers 440 by the complex-valued weighting factors 450. The resulting signals, one for each antenna 430, can be fed to transceivers 410 where the baseband signal may be converted to a carrier frequency. The transceivers 410 may also apply filtering and additional processing to the signal. The transceiver output can then be passed to the power amplifiers (PA) 420 where the signals' power is increased. The output of the PAs 420 can then be fed to the antennas 430. The phase and amplitude of the signals in each antenna 430 of the array of antennas can be therefore be controlled so as to obtain a constructive pattern at the terminal 110. The beams or transmit radiation patterns can be adjusted in the horizontal and the vertical direction by changing the weighting factors 450. Transmission-power adjustment or deployment of beams for transmitting and receiving signals can be used to meet channel requirements. Beamforming can help to cope with multipath situations and can overcome extra attenuation by providing extra power concentration. Beamforming can also be used to reduce interference to adjacent cells or co-scheduled UEs within a cell or coordinating cluster of cells in case of MU-MIMO. The method of beamforming illustrated in FIG. 4 is only an exemplary example to implement beamforming of a data stream 460. Alternatively, the weighting factors may be applied after the signal has been translated to the carrier frequency either immediately after the transceiver or after the PA or may be divided in to multiple weighting factors applied at different locations in the transmit chain, e.g., a weighting factor applied in baseband and a weighting factor applied after the transceiver.

One approach for forming vertical and/or horizontal beams at the eNB 120 can be based on a static beam configuration. For example, LN static vertical beams or virtual antennas can be formed with partial overlap. M antenna elements within each column in FIG. 3 can be virtualized to form L vertical beams per column, such as when ML=8 and M=4, then L=2 vertical beams per column can be obtained from M=4 elements of each column. The M=4 elements in a column may be adjacent contiguous group of antenna elements as shown in FIG. 3 or may be interleaved or non-contiguous group of antenna elements (not shown in FIG. 3) such as every other antenna element in the column. Different columns may use different groups of antenna elements (M=4 antenna elements in this example) to form a virtual antenna from that column. Thus, with N columns in the antenna array 300 in FIG. 3, LN Channel State Information Reference Signal (CSI-RS) antenna ports can be configured; each CSI-RS antenna port assigned to each vertical beam or virtual antenna of each column. In other words, each CSI-RS port can correspond to a single virtual antenna formed from a vertical subset array or vertical subarray of M elements within a column. Assuming each antenna element has a uniform response in azimuth, the LN beams can propagate uniformly in azimuth, but with different elevation angles. For $d_H=4\lambda$ spacing, channels from vertical beams or virtual antennas corresponding to different columns may fade independently, such that multipath fading may cause one or more virtual antennas corresponding to a first column of the N columns to experience a fade while virtual antennas corresponding to a second column may experience a peak.

Another approach for forming vertical and/or horizontal beams at the eNB 120 can be based on dynamic beamforming In this approach, Multiple User Multiple Input Multiple Output (MU-MIMO) transmission on Downlink (DL) is enabled where the vertical virtualization is not fixed but changes based on a number of active terminals, such as UE 110, in a base station cell, based on UE locations, based on traffic conditions, and based on other relative considerations. In general, if each Transmit (Tx) antenna element has a Power Amplifier (PA), MLN=64 ports can be linearly transformed or equivalently precoded, to form $N_B$ (<=64) beams. The eNB 120 can use UE location information, DL CQI (Channel Quality Indicator) feedback, DL CSI determined based on Uplink (UL) sounding or uplink channel response reciprocity, such as with Time Division Duplexing (TDD) or multipath direction of arrival reciprocity in FDD and/or Precoding Matrix Indicator (PMI) feedback from the UE 110 to form the beams.

The above approaches for forming beams can exceed 8 beams, which may exceed a number of available CSI-RS ports, such as if L=2 and N=8. The beams can be designed so that they cover equal area on a two-dimensional plane within a sector of the eNB 120.

Approaches can be envisioned for vertical sectorization. Beamforming within the M vertical antenna elements can be denoted as vertical beamforming, elevation beamforming, or Level-1 beamforming, and beamforming across the NL beams or virtual antennas can be denoted as horizontal beamforming, azimuth beamforming, or Level-2 beamforming. This partitioning can be applicable to the UE 110 for PMI feedback. However, this may not be how the eNB 120 may actually form the beams at the transmitter. For example, Level-1 beamforming may be UE-transparent for a first case (Case 1) or it may be based on UE feedback for a second case (Case 2). Level-1 beamforming and Level-2 beamforming can constitute a logical partitioning of vertical/horizontal beamforming across a large number of antenna elements and the associated CSI feedback can be used to assist precoding for transmission from the eNB. The eNB 120 may implement a general precoding algorithm in a UE-transparent manner to schedule users based on Demodulation Reference Signal (DMRS) (i.e., dedicated pilot or reference for a UE) using a 64-element antenna array.

For a first case, (Case 1), Level-2 beamforming can be based on eNB-configured antenna ports. This can be based on determinations at the eNB 120. One use case can be when there is identical vertical sectorization across the N columns of the antenna array. The eNB 120 can use fixed or same weights at the M antenna elements of each vertical subset array across the columns, such as in Active Antenna Systems (AAS). Each beam or virtual antenna of the NL virtual antennas can be mapped to a CSI-RS antenna port. The UE 110 can determine $N_S$ (=1 or more) strongest beam(s) and can send a report, which can include one or more of beam index/CSI-RS port index and an associated CSI-RS Reference Signal Received Power (RSRP), to the eNB 120. In an alternate embodiment, assuming that the antenna elements have uniform response in azimuth, the UE 110 may average the power contribution across the N CSI-RS ports corresponding to the N virtual antennas with the same vertical sectorization (or same weights for the vertical subset array across the N columns or in other words the same elevation direction) for CSI-RS or vertical sector RSRP determination (The beam index in the report in this case would be vertical sector index indicating the strongest vertical sector out of the L vertical different vertical sectors or different elevation angles). Based on the vertical sector the UE 110 belongs to, the eNB 120 can configure a subset of the NL=16 ports (e.g., N antenna ports) in one or more CSI-RS resources for Rank Indicator/Precoding Matrix Indicator (RI/PMI) and Channel Quality Indicator (CQI) feedback to enable Level-2 beamforming across the virtualized antennas, such as for the equivalent antenna ports obtained post Level-1 beamforming for the vertical sector the UE belongs to. The number of beams or CSI-RS antenna ports for RI/PMI reporting to assist Level-2 beamforming can be configured by the eNB.

For a second case (Case 2), Level-2 beamforming can be based on UE-selected antenna ports. This use case can occur when there is non-identical vertical sectorization across columns. UE reporting of CSI-RS RSRP may be insufficient to configure appropriate virtualization. Thus, the UE 110 can provide assistance in the form for PMI feedback for beamforming.

For a third case (Case 3), Vertical-Horizontal Kronecker product beamforming can be used. The corresponding codebook can include all or a subset of possibilities of Kronecker products between (rank 1) vertical precoding vectors and horizontal precoding matrices. The rank of the precoding matrix corresponding to a codebook entry can correspond to the number of streams that can be supported by the channel between the UE 110 and the eNB 120. If the horizontal codebook includes rank 1 precoding vectors, which have unit magnitudes and linearly progressing phases, then this technique can be pictured as each codebook entry corresponding to a pair of launch angles of a transmitted stream, one in azimuth, determined by a horizontal precoder, and one in elevation, determined by the vertical precoder.

One solution for Case 2 can extend a RI/PMI feedback approach. One codebook, $C_H$, can quantize the short-term variations of the channel matrix for an equivalent horizontal array formed by a particular virtualization of M elements within each column. Another codebook, $C_V$, can be used for spatial quantization of an equivalent vertical array to help the eNB virtualize the M elements within each column. $C_H$ can be a Release 10 codebook with possible enhancements for 4 transmit antennas (Tx) in the equivalent horizontal array, such as a codebook using a $W_1W_2$ weighting structure (precoder corresponding to a codebook entry is a matrix multiplication of two matrices, $W_1$ and $W_2$), where a precoding vector or matrix applies weights to signals transmitted from each antenna in an antenna array. According to another implementation, $C_H$ can be an enhanced Release 10 codebook, which can allow for a dual codebook structure for 4 Tx and finer quantization for 4 Tx and 8 Tx cases. Since PMI reporting based on $C_H$ and $C_V$ can serve different purposes, $C_V$ can be designed separately from $C_H$, while taking into account different antenna geometries, separations, and other factors. For UE-assisted virtualization of M antenna elements, $C_V$ can be a subset of rank-1 codebook with rank 1 precoding vectors from one of Release-10 2 Tx, 4 Tx and 8 Tx codebooks depending on the value of M. Alternatively, other codebooks with finer quantization, such as Vector Quantization (VQ) based on a Lloyd method, a Grasmannian codebook, or other codebooks can be used. For each of the $n^{th}$ vertical subset array of M vertical antenna elements, a vector, $\hat{p}_n$, from $C_V$ can be chosen by maximizing some metric that involves ergodic or equivalently, long-term time averaging. For example, metric such as based on $$\hat{p}_n = \underset{p \in C_V}{\arg\max}\, E_{H_V}\left[\|H_V^{(n)}p\|_F^2\right],$$

where $H_V^{(n)}$ is the channel matrix associated with the n-th vertical subset array of M vertical transmitting antenna elements, where n=1, . . . , NL. The notation $\|\bullet\|_F$ denotes the Frobenius norm which is the sum of the magnitude square of the matrix's elements. The ergodic averaging can be done over a longer duration, such as 200-400 ms, than that used for reporting RI/PMI (or codebook indices of PMI in case of dual codebook $W_1W_2$ weighting structure) for $C_H$ that quantizes the fading applicable to the channel matrix of the equivalent horizontal array. In order to help the UE 110 estimate $H_V^{(n)}$, the eNB 120 can transmit CSI-RS from the M vertical antenna elements of the n-th vertical subset array on different CSI-RS antenna ports. With the Frobenius norm criterion above, the UE 110 can select a precoding vector such that $$\hat{p}_n = \underset{p \in C_V}{\arg\max}\, p^* E_{H_V}[H_V^{(n)*} H_V^{(n)}]p.$$

The operator $(\bullet)^*$ denotes the conjugate transpose of a vector or matrix. The unconstrained maximizer of the argument can be the eigenvector associated with the largest eigenvalue of the transmit covariance matrix $E_{H_V}[H_V^{(n)*}H_V^{(n)}]$. If the beamforming across each set of M elements or vertical subset arrays is identical, such as with identical beamforming within all columns, $E_{H_V}[H_V^{(n)*}H_V^{(n)}]$ can be approximately independent of n, i.e., the beam index. Therefore, it can be sufficient for the eNB 120 to request the UE 110 to report only one maximizer $\hat{p}$ across all n if the vertical transmit covariance matrix or vertical correlation properties of the channel is expected to remain approximately independent of n. In this case, the eNB 120 can configure a first CSI-RS resource with M CSI-RS antenna ports and transmit CSI-RS on antenna ports corresponding to only one set of M antenna elements to enable feedback to assist Level-1 beamforming. Alternatively, the eNB can transmit the same CSI-RS signal from an antenna element (out of the M antenna elements) of each of the more than one (or all) NL vertical subset arrays thereby corresponding to a logical CSI-RS antenna port formed from NL antenna elements from the different vertical subset arrays. This can help the eNB 120 with better PA utilization or more fully utilize all the PAs. The eNB 120 can configure a second CSI-RS resource which can include Level-1 beamforming or precoding on the CSI-RS transmission on CSI-RS antenna ports corresponding to the second CSI-RS resource. This second CSI-RS resource can be used for determining RI/PMI and/or associated CQI to assist the eNB 120 in Level-2 beamforming. More details for this Case 2 are provided below.

If $E_{H_V}[H_V^{(n)*}H_V^{(n)}]$ is not independent of n (the beam index), such as with non-identical vertical sectorization of the antenna columns, the eNB 120 can configure NML CSI-RS antenna ports within multiple CSI-RS resources, such as NL sets of CSI-RS resources, where each CSI-RS resources can include M CSI-RS antenna ports. This can be done with larger DL overhead. For this approach, the precoder selection from codebook $C_H$ involves the following steps: First, the UE 110 can form an effective channel matrix $H_e = [H_V^{(1)}\hat{p}_1, \ldots, H_V^{(NL)}\hat{p}_{NL}]$ and can find a precoding matrix, predicated on the selected beamformers, $\hat{p}_n$, n=1, ..., NL, for the NL beams corresponding to the NL vertical subset arrays, applicable to Level-2 beamforming. For example, the UE can find the precoding matrix as $$\hat{P} = \arg\max_{P \in C_H} E[\|H_e P\|_F^2],$$

where the expectation is an average over the subframes/subbands of interest. This can be the same as $$\hat{P} = \arg\max_{P \in C_H} tr[P^* E[H_e^* H_e] P].$$

Second, prior to selecting the RI/PMI for Level-2 beamforming, the UE 110 can down-select to $N_S$ ($1 \leq N_S \leq NL$) strongest beams before determining a suitable precoding matrix, and forming an effective channel matrix as $$H_e = \left[ H_V^{(i_1)} \hat{p}_{i_1}, \ldots, H_V^{(i_{N_S})} \hat{p}_{i_{N_S}} \right],$$

where $i_1, i_2, \ldots, i_{N_S}$ can be indexes corresponding to the $N_S$ strongest beams. Third, $N_S$ can be selected by the UE 110 using a threshold criterion, such as the beams with received power are within X=3 dB of the strongest beam. This can ensure that all beams with comparable received signal strength are included in RI/PMI computation to assist Level-2 beamforming. Fourth, the hierarchical PMI selection can be viewed as a suboptimal solution to the double maximization as follows:

$$\hat{P} = \arg\max_{P \in C_H} E[\|H_e P_H\|_F^2] \quad \text{(Eq. 1)}$$

$$= \arg\max_{P_H \in C_H} \max_{p_1, \ldots, p_{i_{N_S}} \in C_V} E\left[ \left\| [H_V^{(i_1)} \ldots H_V^{(i_{N_S})}] \underbrace{\begin{bmatrix} p_1 & \cdots & 0 \\ \vdots & \ddots & \vdots \\ 0 & \cdots & p_{i_{N_S}} \end{bmatrix}}_{P_V} P_H \right\|_F^2 \right],$$

where the two maximizations can be performed over different time scales.

In the sequel, we can have $N_S$ take its maximum value, $N_S = NL$. In addition, we can have the variable N take the place of NL.

With changed notation, the above maximization can be written as:

$$\hat{P} = \arg\max_{P_H \in C_H} \max_{p_1, \ldots, p_N \in C_V} E\left[ \left\| [H_V^{(1)}, \ldots, H_V^{(N)}] \underbrace{\begin{bmatrix} P_1 \\ \vdots \\ P_N \end{bmatrix}}_{P_V} P_H \right\|_F^2 \right]. \quad \text{(Eq. 2)}$$

where $P_V$ is a MN×N matrix composed of matrices $P_1$ through $P_N$ stacked one on top of the other with $P_1$ on the top. $P_1$ through $P_N$ are M×N matrices.

Due to UE mobility, in general, the vertical angle subtended at the eNB array can change much slower than the horizontal angle. Thus, the virtualization applied within the M vertical elements in each column may not need to be changed as often as the precoding across columns or precoding corresponding to the horizontal beamforming. For example, the UE 110 can send PMI for $C_V$, with no channel quality indicator (CQI) and rank indicator, much less often than the PMI for $C_H$, such as 160 ms or 320 ms for PMI from $C_V$, as opposed to 5, 10, 20 ms for PMI from $C_H$. New multiplexing schemes for slow and fast rate reporting for periodic reporting can be used.

For example, for joint selection of precoding matrices (Case 2) and for a block-Kronecker structure (Case 3), the UE 110 can receive a set of CSI-RS. The UE 110 can determine, based on the received set of CSI-RS, a precoding matrix that is a product of first precoding matrix $P_V$ and a second precoding matrix $P_H$. $P_V$ can have at least a representation in terms of N matrices, $P_{V,k}[1 \leq k \leq N]$. Each matrix $P_{V,k}$ can be based on at least one column vector ($p_k$) selected from a first codebook. Also, $P_H$ can be based on a second codebook. For example, this can be based on the Eq. 2 above, where $$\underbrace{\begin{bmatrix} P_1 \\ \vdots \\ P_N \end{bmatrix}}_{P_V} P_H \quad \text{(Eq. 3)}$$

The UE 110 can then transmit a representation of at least one of the first precoding matrix and the second precoding matrix.

The product of $P_V$ and $P_H$ can be a matrix product $P_V P_H$, and $$P_V = \begin{bmatrix} P_{V,1} \\ \vdots \\ P_{V,N} \end{bmatrix}, \text{ and} \qquad \text{(Eq. 4)}$$

$P_{V,k}$ can be a matrix such that only the $k^{th}$ column of $P_{V,k}$, equal to $p_k$, can be non-zero. For example, this can be based on the Eq. 1 above, where $$\begin{bmatrix} P_{V,1} \\ \vdots \\ P_{V,N} \end{bmatrix} = \begin{bmatrix} p_1 & \cdots & 0 \\ \vdots & \ddots & \vdots \\ 0 & \cdots & p_N \end{bmatrix}. \qquad \text{(Eq. 5)}$$

The product of $P_V$ and $P_H$ can also be a block-Kronecker product denoted by the symbol *

$$\begin{aligned} P_V * P_H &= \\ &[P_V(:,1) \otimes P_H(:,1) P_V(:,2) \otimes P_H(:,2) \ldots P_V(:,r) \otimes P_H(:,r)] \end{aligned} \qquad \text{(Eq. 6)}$$

where $$P_V(:,p) = \begin{bmatrix} 1 \\ e^{j\phi_p} \\ \vdots \\ e^{j(M-1)\phi_p} \end{bmatrix}, \qquad \text{(Eq. 7)}$$

where $P_H(:,p)$ is the $p^{th}$ column of the horizontal precoding matrix taken from the second codebook, and ⊗ denotes the Kronecker matrix product. With this structure, for a given layer p, the same vertical precoder $P_V(:,p)$ is used across all columns of antennas. However, the vertical precoders for different layers may be different.

A solution for Case 2 can perform Level-1 beamforming identical across different sets of M elements as mentioned earlier. For this case, it can be assumed that $E_{H_V}[H_V^{(n)*} H_V^{(n)}]$ is approximately independent of n, i.e., the beam index. Therefore, only one CSI-RS resource with M CSI-RS antenna ports corresponding to one set of M elements may be configured to assist Level-1 beamforming. The eNB 120 can configure a second CSI-RS resource including NL antenna ports where CSI-RS from each antenna port can be obtained or can be precoded by Level-1 beamforming or precoding within M antenna elements. This second CSI-RS resource can be used for determining RI/PMI and/or associated CQI to assist the eNB 120 in Level-2 beamforming.

A UE can be configured with multiple CSI processes to support Coordinated Multipoint (CoMP) scheduling and transmission from multiple Transmission Points (TPs). A CSI process is associated with the generation of one set of CSI which can consist of PMI for vertical or Level-1 beamforming, PMI for horizontal or Level-2 beamforming, RI, and/or CQI, based on an associated one or more CSI-RS resource(s) (for which the UE assumes non-zero transmission power for the CSI-RS) and one or more interference measurement resource. For enabling RI/PMI feedback to assist Level-1 and Level-2 beamforming, a first CSI-RS resource associated with a CSI process can be configured to target PMI feedback to assist Level-1 beamforming. A second CSI-RS resource associated with the CSI process can be configured to target RI/PMI and/or associated CQI feedback towards Level-2 beamforming. The CSI-RS antenna ports in the first CSI-RS resource and second CSI-RS resource associated with the CSI process can be configured independently. In some embodiments, the second CSI-RS resource may comprise a plurality of sub-CSI-RS resources, each sub-CSI-RS resource associated with one of the L vertical subarrays and comprising N CSI-RS antenna ports; the sub-CSI-RS resources can be configured independently or in a configuration list or a bitmap with each bit set to one indicating a predetermined CSI-RS resource for a sub-CSI-RS resource preferably in order for the L vertical subarrays. Codebook subset restriction can be independently applied for CSI associated with the first CSI-RS resource (Level-1 beamforming) and CSI associated with the second CSI-RS resource (Level-2 beamforming) of the CSI process. For example, to assist Level-1 beamforming, a codebook subset restriction can be applied to use PMI reporting corresponding to the first CSI-RS resource constrained to rank 1 feedback with possibly a subset of the rank 1 precoders. The precoder codebook associated with the Level-1 and Level-2 beamforming can be different. In one example, special codebook(s) can be designed for PMI feedback to assist Level-1 beamforming. Thus, the UE 110 can be configured with a first codebook associated with the first CSI-RS resource and a second codebook associated with the second CSI-RS resource.

Case 3 can use Vertical-Horizontal Kronecker product beamforming. Instead of optimizing the virtualization for each column as is done in the solutions above, a common virtualization across columns for each horizontal precoder can instead be optimized. Unlike the solutions above, the virtualization can be performed on LM antenna elements instead of on L groups or vertical subarrays of M antenna elements each. For example, let $H_m$, m=1, 2, . . . , LM be the $N_r \times N$ channel response matrix whose $(n_r, n)$ entry is the channel between the $m^{th}$ antenna element of the $n^{th}$ column and the $n_r$ receive antenna. Further, let the horizontal codebook have K entries. As with Case 2, LMN CSI-RS antenna ports can be used to obtain estimates of all M channel matrices, $H_m$, m=1, 2, . . . , LM, with the CSI-RS antenna ports configured in one or more CSI-RS resources. The optimum vertical precoder can be found for each horizontal precoder. Then, given this optimum vertical precoder, the best horizontal precoder can be found. In other words, a preferred or recommended (vertical precoder, horizontal precoder) pair can be determined. The case of rank 1 precoding is first discussed followed by the higher rank case.

For rank 1 precoding, let $\tilde{H}_V^{(k)}$ be the $N_r \times LM$ channel when horizontal precoding with the $k^{th}$ precoder, $q_k$, of the codebook is applied across each of the LM rows of the array:

$$\tilde{H}_V^{(k)} = [H_1 q_k H_2 q_k \ldots H_{LM} q_k] \qquad \text{(Eq. 8)}$$

The $N_r \times 1$ effective channel $h_e^{(k,p)}$ that includes both horizontal precoding by the k th horizontal precoder and vertical precoder p can then be $$h_e^{(k,p)} = \tilde{H}_V^{(k)} p \qquad \text{(Eq. 9)}$$

Similar to Case 2, the optimum vertical precoder can be obtained by maximizing over the expected channel $$\hat{p}_k = \arg\max_p E_{\tilde{H}_V} \|h_e^{(k,p)}\|^2 \qquad \text{(Eq. 10)}$$

where $\hat{p}_k$ is the optimum vertical precoder corresponding to horizontal precoder k. The optimum horizontal precoder can then be obtained by maximizing over k:

$$\hat{k} = \max_{k \in \{1,2,\ldots,K\}} E\left\|h_e^{(k,\hat{p}_k)}\right\|^2. \quad \text{(Eq. 11)}$$

The expectation can be an average over the subframes/subbands of interest and can be on a different time/frequency scale than the optimization in Equation (Eq. 11). An alternative to using LMN CSI-RS antenna ports and calculating $\tilde{H}_V^{(k)}$ for each hypothesized value of $q_k$ is for the eNB 120 to apply a precoder k of the horizontal codebook across the rows of the array, and transmit precoded CSI-RS on ML CSI-RS antenna ports where each CSI-RS antenna port corresponds to a precoded row, resulting in direct measurement of $\tilde{H}_V^{(k)}$ at the UE 110. This can be useful if the size of the codebook, K, is less than the number of columns N.

For precoding when the rank is greater than one, let the rank r codebook of size $N_{cb}$ be represented as the collection of N×r matrices $Q_k$, k=1, 2, ..., $N_{cb}$. Let $\tilde{H}_V^{(k)}$ be the $N_r$×LM channel when horizontal precoding with the $i^{th}$ column of the $k^{th}$ precoder, $Q_k(:,i)$, is applied across each of the LM rows of the array:

$$\tilde{H}_V^{(k)} = [H_1 Q_k(:,i) H_2 Q_k(:,i) \ldots H_M Q_k(:,i)] \quad \text{(Eq. 12)}$$

If precoder $p^{(k,i)}$ is applied to layer i, then the $N_r$×r equivalent channel can be $$H_e^{(k,p^{(k,1)},\ldots,p^{(k,r)})} = [\tilde{H}^{(k,1)} p^{(k,1)} \tilde{H}^{(k,2)} p^{(k,2)} \ldots \tilde{H}^{(k,r)} p^{(k,r)}] \quad \text{(Eq. 13)}$$

For the $k^{th}$ horizontal precoding matrix, there can be one vertical precoder $p^{(k,i)}$, i=1, 2, ..., r for each layer. In the case of a single rank transmission, the optimal precoder is well defined as the precoder which maximizes the energy of the received signal, or equivalently, the Frobenius norm of the received signal vector. In the case of multi-layer transmissions, optimization is more complicated as there is the need separate the multiple layers at the receiver. However, in the case of low signal-to-noise ratio, the optimal (multi-layer) precoder can again be defined as the precoder which maximizes the energy of the received signal, or equivalently, maximizes the Frobenius norm of the received signal matrix. Optimizing over the set of r vertical precoders then gives $$\hat{p}^{(k,1)}, \ldots, \hat{p}^{(k,r)} = \arg\max_{p^{(k,1)},\ldots,p^{(k,r)}} \left\|H_e^{(k,p^{(k,1)},\ldots,p^{(k,r)})}\right\|^2 \quad \text{(Eq. 14)}$$

Here the maximization can be over the vertical precoding codebook. Finally, the optimum horizontal precoder can be selected:

$$\hat{k} = \arg\max_k \left\|H_e^{(k,\hat{p}^{(k,1)},\ldots,\hat{p}^{(k,r)})}\right\|^2 \quad \text{(Eq. 15)}$$

By selecting a different vertical precoder for each layer, paths with different elevation angles can be assigned to different layers. The solution to Case 3 can be equivalent to the solution in Case 2 where $$p_1, p_2, \ldots, p_{i_{N_S}}$$

are constrained to be the same.

For two dimensional CSI-RS port mapping, CSI-RS reference signals can be constructed in two dimensions where reference signals from one dimension are transmitted on antenna ports corresponding to the antenna elements of one column. Thus, the reference signals from one dimension can be transmitted on vertical antenna elements. The CSI reference signals can therefore be transmitted on a two dimensional array of antenna ports of sizes M×2, M×4, M×8, etc. where M is the number of antenna ports in the vertical direction.

For a precoder structure, the precoding matrices for Case 2 and Case 3 with identical precoding in each column can have a specific structure. For Case 2 and Case 3 with rank one precoding, the precoding matrix can be written as a Kronecker product of horizontal and vertical precoding matrices. For Case 3 with rank>1 precoding, the precoding matrix can be equal to a block Kronecker matrix product of vertical and horizontal precoding matrices. This is explained in more detail below. First, however, is a short summary of 3GPP Release 10 precoding.

Release 10 precoding can be of the form $$y = W_1 W_2 x \quad \text{(Eq. 16)}$$

where $W_1$ can be a wideband precoder that takes advantage of the correlation properties of the channel, properties which are long-term in nature, and $W_2$ performs co-phasing on a short-term basis. Here x is the vector of modulated symbols and y is the vector of signal transmitted from each PA. The matrix $W_1$ has the structure $$W_1 = \begin{bmatrix} \tilde{W} & 0 \\ 0 & \tilde{W} \end{bmatrix} \quad \text{(Eq. 17)}$$

where the $N_T/2 \times r$ matrix $\tilde{W}$ has columns taken from an oversampled Discrete Fourier Transform (DFT) matrix. The 2r×r co-phasing matrix $W_2$ is of the form $$W_2 = \begin{bmatrix} 1 \\ \alpha \end{bmatrix}; \alpha \in \{1, -1, j, -j\} \quad \text{(Eq. 18)}$$

for rank 1 and $$W_2 = \begin{bmatrix} 1 & 0 \\ 0 & 1 \\ \alpha & 0 \\ 0 & -\alpha \end{bmatrix}; \alpha \in \{1, j\} \quad \text{(Eq. 19)}$$

for rank 2.

For single elevation vertical beamforming, when the transmit antenna array is two dimensional with the second dimension being the vertical direction and a common elevation is applied regardless of the choice of $W_1$ and $W_2$, the vector of Power Amplifier (PA) outputs can be expressed as $$y = W_0 \otimes (W_1 W_2) x \quad \text{(Eq. 20)}$$

where $$W_0 = [1 \; e^{j\phi} \; \ldots \; e^{j(N_V-1)\phi}]^T.$$

Here the ordering of elements in the $N_V N_T$ vector y is first all of the elements with the lowest vertical dimension, then the elements with the next highest vertical dimension, and so on.

The CSI feedback for the matrix $W_o$ can be of a low rate since the vertical elevation angle φ is expected to change slowly, on the order of seconds, and likely to be much slower than changes in $W_1$ ($W_1$ typically changes slowly compared to $W_2$).

For multi-elevation vertical beamforming, it also possible to apply different elevations to different layers. For example, in the rank 2 case, the elevation beamforming matrix may be of size $N_V \times 2$ and be of the form $$W_0 = \begin{bmatrix} 1 & 1 \\ e^{j\phi_1} & e^{j\phi_2} \\ \vdots & \vdots \\ e^{j(N_v-1)\phi_1} & e^{j(N_v-1)\phi_2} \end{bmatrix} \quad \text{(Eq. 21)}$$

If $W'=W_1 W_2$, then the precoding matrix can be written as $$[W_0(:,1) \otimes W'(:,1) \quad W_0(:,2) \otimes W'(:,2)] = \quad \text{(Eq. 22)}$$
$$\begin{bmatrix} W'(:,1) & W'(:,2) \\ e^{j\phi_1} W'(:,1) & e^{j\phi_2} W'(:,2) \\ \vdots & \vdots \\ e^{j(N_v-1)\phi_1} W'(:,1) & e^{j(N_v-1)\phi_2} W'(:,2) \end{bmatrix}$$

The block Kronecker product (also called the Khatri-Rao matrix product) of two matrices A*B, both of size M×N (the M and N here are not related to the M and N defined above in relation to FIG. 3, but rather are used only to define the block Kronecker product), where the matrices are partitioned $$A = \begin{bmatrix} A_{11} & A_{12} & \ldots & A_{1N} \\ A_{21} & A_{22} & \ldots & A_{2N} \\ \vdots & \vdots & \ddots & \vdots \\ A_{M1} & A_{M2} & \ldots & A_{MN} \end{bmatrix} \quad \text{(Eq. 23)}$$

and $$B = \begin{bmatrix} B_{11} & B_{12} & \ldots & B_{1N} \\ B_{21} & B_{22} & \ldots & B_{2N} \\ \vdots & \vdots & \ddots & \vdots \\ B_{M1} & B_{M2} & \ldots & B_{MN} \end{bmatrix} \quad \text{(Eq. 24)}$$

is defined as $$A*B = \begin{bmatrix} A_{11} \otimes B_{11} & A_{12} \otimes B_{12} & \ldots & A_{1N} \otimes B_{1N} \\ A_{21} \otimes B_{21} & A_{22} \otimes B_{22} & \ldots & A_{2N} \otimes B_{2N} \\ \vdots & \vdots & \ddots & \vdots \\ A_{M1} \otimes B_{M1} & A_{M2} \otimes B_{M2} & \ldots & A_{MN} \otimes B_{MN} \end{bmatrix}. \quad \text{(Eq. 25)}$$

The precoding matrix used in multi-elevation beamforming can therefore be seen to be a block Kronecker product with M=1 and N=2.

Combined azimuth and elevation spatial multiplexing beamforming may be cast in a grid of beams structure. Before illustrating this, one particular type of grid of beams structure is described. This structure is then shown to encompass 8 port Release 10 spatial multiplexing. The same structure is then shown to apply to single polarization combined azimuth and elevation beamforming Finally, the structure is applied in a recursive or nested way to dual-polarization combined azimuth and elevation beamforming.

For the grid of beams formulation, assume L=1, with M subarrays, each of size N, for a total of MN elements. The subarrays (and the N antenna elements of the subarray) are chosen such that within a sub-array, correlation is large with the correlation structure slowly varying in time. In contrast, the fading of the channels between subarrays has low correlation with the relative phase between the subarrays' channels varying rapidly. An efficient precoding matrix, C, for this scenario can have the following decomposition:

$$C = G(X, B) \quad \text{(Eq. 26)}$$

where C is NM×p, X is N×p, and B is Mp×p, and G(X,B) is given by $$G(X, B) = \begin{bmatrix} X & 0 & 0 \\ 0 & \ddots & 0 \\ 0 & 0 & X \end{bmatrix} \begin{bmatrix} B_1 \\ \vdots \\ B_M \end{bmatrix} = C_1 C_2 \quad \text{(Eq. 27)}$$

The matrix X has p columns and is a component precoding matrix that is applied across each of the subarrays while B contains relative weighting factors to be applied between subarrays and is of the form $$B = \begin{bmatrix} B_1 \\ \vdots \\ B_M \end{bmatrix} \quad \text{(Eq. 28)}$$

In Release 10 precoding, the subarray are elements with the same polarization of a dual-polarized array of length $N_H$, i.e., M=2. The horizontal precoding matrix X is equal to the $N_H \times p$ matrix V where the columns of V are from the set $\{f^{(2i_1k)}: 0 \le i_1 \le 15, 0 \le k \le 3\}$, where $v_m = v^{(m)} = [1 \; e^{j2\pi m/32} \; e^{j4\pi m/32} \; e^{j6\pi m/32}]^T$. The columns are therefore beamforming vectors that are chosen to point to or in the direction of the dominant scatterers in the environment. The matrix B is equal to the block diagonal 2p×p matrix A, which is composed of two diagonal blocks, the first of which is the identity matrix $$A = \begin{bmatrix} I \\ A_2 \end{bmatrix}. \quad \text{(Eq. 29)}$$

Each non-zero element of A is from the set $\{1, -1, j, -j\}$. The matrix A contains weighting factors that weight different polarizations. Namely, the first half of the rows of W are applied to antenna elements of one polarization while the remaining rows are applied to elements of the other polarization. The precoding matrix W can be written as the product of matrices $W_1$ and A:

$$W = G(V, A) = \underbrace{\begin{bmatrix} V & 0 \\ 0 & V \end{bmatrix}}_{W_1} \underbrace{\begin{bmatrix} 1 & & & & \\ & \ddots & & & \\ & & 1 & & \\ & & & A_2(1,1) & & \\ & & & & \ddots & \\ & & & & & A(p,p) \end{bmatrix}}_{A} = W_1 A \quad \text{(Eq. 30)}$$

As an example consider the two layer case, p=2. With $A_2(1,1)=j$, $A_2(2,2)=-j$, and $V=[v_1\ v_2]$, the overall precoding matrix W is of the form $$W = \begin{bmatrix} v_1 & v_2 \\ jv_1 & -jv_2 \end{bmatrix}. \qquad \text{(Eq. 31)}$$

This structure is found in Table 1 which is an exemplary two layer codebook used for CSI feedback from prior art. In particular all elements of the codebook $W_{m,m',n}^{(2)}$ with $m \ne m'$ and n=1 exhibit this structure. With $A_2(1,1)=1$ and $A_2(2,2)=-1$, the elements with $m \ne m'$ and n=0 can be generated. It can be seen from Table 1 that an element of the codebook or precoding matrix is determined by a pair of codebook indices, $i_1$ and $i_2$. The generation of the remaining elements will be discussed below.

TABLE 1

Codebook for 2-layer CSI reporting using antenna ports 15 to 22

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| | $i_2$ | | | |
|---|---|---|---|---|
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \phi_n v_m & -\phi_n v_{m'} \end{bmatrix}$ where $\phi_n = e^{j\pi n/2}$.

For single polarization with combined azimuth and elevation beamforming, the grid of beams formulation can be applied to combined azimuth and elevation beamforming with single polarization over an antenna array of size $N_V \times N_H$. This can be done by replacing the phase weighting factors in A that weight the different polarizations with the product of an elevation precoding matrix U that contain phase factors that weight the $N_V$ rows of the array, (i.e. each row of the array is a subarray) and a new $N_V p \times p$ phase weighting matrix $A_{sp}$, where the subscript sp denotes single polarization. The $N_V p \times N_V p$ matrix U therefore has the form $$U = \begin{bmatrix} I_p & & & \\ & P & & \\ & & \ddots & \\ & & & P^{N_V - 1} \end{bmatrix}, \qquad \text{(Eq. 32)}$$

$$P = \begin{bmatrix} e^{j\phi_1} & & & \\ & e^{j\phi_2} & & \\ & & \ddots & \\ & & & e^{j\phi_p} \end{bmatrix}, \qquad \text{(Eq. 33)}$$

where $\phi_1, \ldots, \phi_p$ are the phase increments applied vertically in the array for the p columns of the horizontal precoding matrix V. Using the horizontal precoding matrix V defined above and $UA_{sp}$ in the grid of beams formulation of Eq. (30) gives $$W_{sp} = G(V, UA_{sp}) = \qquad \text{(Eq. 34)}$$

$$\underbrace{\begin{bmatrix} V & & 0 \\ & V & \\ & & \ddots \\ 0 & & V \end{bmatrix}}_{W_{sp,1}} \underbrace{\begin{bmatrix} I & & 0 \\ & P & \\ & & \ddots \\ 0 & & P^{N_V-1} \end{bmatrix}}_{U} \underbrace{\begin{bmatrix} I \\ A_{sp,2} \\ \vdots \\ A_{sp,N_V} \end{bmatrix}}_{=A_{sp}} = W_{sp,1} UA_{sp}$$

The component matrices of $A_{sp}$, $A_{sp,2}, \ldots, A_{sp,N_V}$, are diagonal matrices of the form $$A_{sp,i} = \begin{bmatrix} a_{sp,i,1} & & & 0 \\ & a_{sp,i,2} & & \\ & & \ddots & \\ 0 & & & a_{sp,i,p} \end{bmatrix}, i = 2, 3, \ldots, N_V. \qquad \text{(Eq. 35)}$$

The precoding matrix therefore factors into the product of $N_H N_V \times p N_V$ azimuth precoding matrix $W_{sp,1}$, $pN_V \times pN_V$ elevation precoding matrix U, and the $N_V p \times p$ phase weighting matrix $A_{sp}$. Expanding this product results then gives $$W_{sp} = \begin{bmatrix} v_1 & v_2 & \cdots & v_p \\ a_{sp,2,1} e^{j\phi_1} v_1 & a_{sp,2,2} e^{j\phi_2} v_2 & \cdots & a_{sp,2,p} e^{j\phi_p} v_p \\ \vdots & \vdots & \vdots & \vdots \\ a_{sp,N_v,1} e^{j(N_V-1)\phi_1} v_1 & a_{sp,N_v,2} e^{j(N_V-1)\phi_2} v_2 & \cdots & a_{sp,N_v,p} e^{j(N_V-1)\phi_p} v_p \end{bmatrix}. \qquad \text{(Eq. 36)}$$

If the $N_r \times N_H N_V$ channel is denoted as H and the vector of modulation symbols s, then the vector y received at the receiver can be:

$$y = HW_{sp,1} UA_{sp} s \qquad \text{(Eq. 37)}$$

$$= H_e A_{sp} s$$

where $H_e = HW_{sp,1} U$ is the $N_r \times p$ effective channel and therefore, the matrix $A_{sp}$ can be thought of as an effective rank p precoding matrix for the effective channel.

The results of the previous section can be extended to the dual polarization case with combined azimuth and elevation beamforming. The results of the grid of beams function can be applied to the same grid of beams function, with M=2, $N=N_H N_V$ and the 2p×p phase weighting matrix $\tilde{A}_{dp}$. The matrix $\tilde{A}_{dp}$ may be composed of two diagonal matrices, $\tilde{A}_{dp,1}$ and $\tilde{A}_{dp,2}$ stacked one on top of the other. For example, the precoder is given by, $$W_{dp} = G(G(V, UA_{sp}), \tilde{A}_{dp}) = \qquad \text{(Eq. 38)}$$

$$G(W_{sp,1} UA_{sp}, \tilde{A}_{dp}) = \begin{bmatrix} W_{sp,1} UA_{sp} & 0 \\ 0 & W_{sp,1} UA_{sp} \end{bmatrix} \begin{bmatrix} \tilde{A}_{dp,1} \\ \tilde{A}_{dp,2} \end{bmatrix}_{\tilde{A}_{dp}} =$$

$$\underbrace{\begin{bmatrix} W_{sp,1} & 0 \\ 0 & W_{sp,1} \end{bmatrix}}_{W_{dp,1}} \underbrace{\begin{bmatrix} U & 0 \\ 0 & U \end{bmatrix}}_{W_{dp,2}} \underbrace{\begin{bmatrix} A_{sp}\tilde{A}_{dp,1} \\ A_{sp}\tilde{A}_{dp,1} \end{bmatrix}}_{A_{dp}} = W_{dp,1} W_{dp,2} A_{dp}$$

where $W_{dp,1} = I_2 \otimes W_{sp,1}$ and $W_{dp,2} = I_2 \otimes U$. Note that $A_{dp}$ is composed of two diagonal matrices stacked one on top of the other. The sizes of the matrices are as follows:

$$W_{dp}: 2N_H N_V \times p \qquad \text{(Eq. 39)}$$

$$W_{dp,1}: 2N_H N_V \times 2pN_V \qquad \text{(Eq. 40)}$$

$$W_{sp,2}: 2pN_V \times 2p \qquad \text{(Eq. 41)}$$

$$A_{dp}: 2p \times p \qquad \text{(Eq. 42)}$$

Note the similarity between the third line in Eq. 38 and Eq. 30. The matrices $A_{sp}\tilde{A}_{dp,1}$ and $A_{sp}\tilde{A}_{dp,2}$ perform the same weighting across polarizations as the two blocks of A. The precoding structure is seen to have a nested structure that results from repeating a precoding matrix and weighting the repeated versions first for the purpose of elevation beamforming, and then repeating and weighting the result a second time for the purpose of beamforming across polarizations. As in the case of single polarization beamforming, the combined precoding matrix $W_{dp}$ together with the channel matrix H form an effective channel and the matrix $A_{dp}$ acts as a rank p precoding matrix for the effective channel.

In one embodiment, the system 100 uses dual-polarized vertical subarrays. In such a system, the precoder may be implemented as either of the following two canonical decompositions.

Decomposition 1

$$W = G(V, A) = \begin{bmatrix} [v_1 \; v_2 \; \ldots \; v_p] & 0 \\ 0 & [v_1 \; v_2 \; \ldots \; v_p] \end{bmatrix} \qquad \text{(Eq. 43)}$$

$$\begin{bmatrix} 1 & & 0 \\ & \ddots & \\ 0 & & 1 \\ \alpha_1 & & 0 \\ & \ddots & \\ 0 & & \alpha_p \end{bmatrix} \Lambda_{p \times r}.$$

Decomposition 2

$$W = G(V, A) = \begin{bmatrix} [v_1 \; v_2 \; \ldots \; v_p] & 0 \\ 0 & [v_1 \; v_2 \; \ldots \; v_p] \end{bmatrix} \qquad \text{(Eq. 44)}$$

$$\begin{bmatrix} 1 & 0 & 1 & 0 \\ & \ddots & & \ddots \\ 0 & 1 & 0 & 1 \\ \alpha_1 & 0 & \beta_1 & 0 \\ & \ddots & & \ddots \\ 0 & \alpha_p & 0 & \beta_p \end{bmatrix} \Lambda_{2p \times r}.$$

Here $\Lambda_{2p \times r}$ is a 2p×r matrix, such as a 0-1 matrix comprising r columns of $I_{2p}$ selected in some order. A possible constraint may be r≤p for Decomposition Type 1 and r≤2p for Decomposition Type 2. The columns of V are from the set $\{v^{(2i_1+k)}: 0 \le i_1 \le 15, 0 \le k \le 24\}$, where $v_m = v^{(m)} = [1 \; e^{j2\pi m/32} \; e^{j4\pi m/32} \; e^{j6\pi m/32}]^T$. The codebook index from the UE CSI feedback $i_1$ determines $[v_1 \; v_2 \; \ldots \; v_p]$ at least partially by selecting the main beam direction $v^{(2i_1)}$ or by selecting a beam cluster from a set of partially overlapping beam clusters in a co-polarized subarray. The codebook index $i_2$ from the UE CSI feedback determines a. $\alpha_k$ or and $\{\alpha_k, \beta_k\}$ and/or b. the beam direction refinement or one of the beams in the beam cluster leading to the selection of $v^{(2i_1+k)}$, 0≤k≤24.

Thus, in some examples $i_1$ and $i_2$ together select $[v_1 \; v_2 \ldots v_p]$, while in some other examples $i_1$ selects $[v_1 \; v_2 \ldots v_p]$.

The values of p for different ranks are shown in Table 2.

TABLE 2

| Values of p for different ranks | | |
| --- | --- | --- |
| Rank r | Decomposition Type | P |
| 1 | Type 1 | 1 |
| 2 | Type 1 or Type 2 | 2 (Type 1) or 1 (Type 2) |
| 3 | Type 1 or Type 2 | 3 (Type 1) or 2 (Type 2) |
| 4 | Type 2 | 2 |
| 5 | Type 2 | 3 |
| 6 | Type 2 | 3 |
| 7 | Type 2 | 4 |
| 8 | Type 2 | 4 |

For a Uniform Linear Array (ULA) subarray, the precoder takes the structure:

$$W_{sp} = \begin{bmatrix} v_1 & v_2 & \cdots & v_p \\ a_{2,1}e^{j\phi_1}v_1 & a_{2,2}e^{j\phi_2}v_2 & \cdots & a_{2,p}e^{j\phi_p}v_p \\ \vdots & \vdots & \vdots & \vdots \\ a_{N_v,1}e^{j(N_v-1)\phi_1}v_1 & a_{N_v,2}e^{j(N_v-1)\phi_2}v_2 & \cdots & a_{N_v,p}e^{j(N_v-1)\phi_p}v_p \end{bmatrix}\Lambda_{p\times r} \quad (\text{Eq. 45})$$

where $a_{k,j}$, $j=1, \ldots, p$ is the complex-valued term that multiplies the beamsteering vector applied to the k-th row of antennas For a dual-polarized subarray, for Decomposition 1, the precoder takes the structure:

$$W_{dp} = \begin{bmatrix} v_1 & v_2 & \cdots & v_p \\ a_{2,1}e^{j\phi_1}v_1 & a_{2,2}e^{j\phi_2}v_2 & \cdots & a_{2,p}e^{j\phi_p}v_p \\ \vdots & \vdots & \vdots & \vdots \\ a_{N_v,1}e^{j(N_v-1)\phi_1}v_1 & a_{N_v,2}e^{j(N_v-1)\phi_2}v_2 & \cdots & a_{N_v,p}e^{j(N_v-1)\phi_p}v_p \\ a_{N_v+1,1}v_1 & a_{N_v+1,2} & \cdots & a_{N_v+1,p} \\ a_{N_v+2,1}e^{j\phi_1}v_1 & a_{2N_v+2,2}e^{j\phi_2}v_2 & \cdots & a_{N_v+2,p}e^{j\phi_p}v_p \\ \vdots & \vdots & \vdots & \vdots \\ a_{2N_v,1}e^{j(N_v-1)\phi_1}v_1 & a_{2N_v,2}e^{j(N_v-1)\phi_2}v_2 & \cdots & a_{2N_v,p}e^{j(N_v-1)\phi_p}v_p \end{bmatrix}\Lambda_{p\times r} = \quad (\text{Eq. 46})$$

$$(I_{2N_v} \otimes [v_1\ v_2\ \cdots\ v_p]) \begin{bmatrix} I_p \\ PA_2 \\ \vdots \\ P^{N_v-1}A_{N_v} \\ A_{N_v+1} \\ PA_{N_v+2} \\ \vdots \\ P^{N_v-1}A_{2N_v} \end{bmatrix} \Lambda_{p\times r} =$$

$$\underbrace{(I_{2N_v} \otimes [v_1\ v_2\ \cdots\ v_p])}_{w_1} \underbrace{\left[I_2 \otimes \begin{bmatrix} I_p \\ & P \\ & & \ddots \\ & & & P^{N_v-1} \end{bmatrix}\right]}_{w_3} \underbrace{\begin{bmatrix} I_p \\ A_2 \\ \vdots \\ A_{N_v} \\ A_{N_v+1} \\ A_{N_v+2} \\ \vdots \\ A_{2N_v} \end{bmatrix}}_{w_2} \Lambda_{p\times r}$$

where $A_k$ is a diagonal phase rotation matrix given by $$A_k = \begin{pmatrix} a_{k,1} & & 0 \\ & \ddots & \\ 0 & & a_{k,p} \end{pmatrix}, k \geq 2, \quad (\text{Eq. 47})$$

$a_{k,j}$, $j=1, \ldots, p$ is the complex-valued term that multiplies the beamsteering vector applied to the k-th row of antennas, the index range $k=1, \ldots, N_V$ corresponds to cross-pole antennas with +45 degrees orientation or co-polarized subarray with a first antenna orientation and the index range $k=N_V+1, \ldots, 2N_V$ corresponds to cross-pole antennas with −45 degrees orientation or co-polarized subarray with a second antenna orientation, and $$P = \begin{bmatrix} e^{j\phi_1} & & & \\ & e^{j\phi_2} & & \\ & & \ddots & \\ & & & e^{j\phi_p} \end{bmatrix}. \quad (\text{Eq. 48})$$

For a dual-polarized subarray for Decomposition 2, in a similar fashion, the precoder for the second type can be written as:

$$W_{dp} = \underbrace{(I_{2N_V} \otimes [\begin{array}{cccc} v_1 & v_2 & \cdots & v_p \end{array}])}_{W_1} \quad \text{(Eq. 49)}$$

$$\underbrace{\left[ I_2 \otimes \begin{bmatrix} I_p & & & \\ & P & & \\ & & \ddots & \\ & & & P^{N_V-1} \end{bmatrix} \right]}_{W_3} \underbrace{\begin{bmatrix} I_p & I_p \\ A_2 & B_2 \\ \vdots & \vdots \\ A_{N_V} & B_{N_V} \\ A_{N_V+1} & B_{N_V+1} \\ A_{N_V+2} & B_{N_V+2} \\ \vdots & \vdots \\ A_{2N_V} & B_{2N_V} \end{bmatrix}}_{W_2} \Lambda_{2p \times r}.$$

where $$B_k = \begin{pmatrix} b_{k,1} & & 0 \\ & \ddots & \\ 0 & & b_{k,p} \end{pmatrix}. \quad \text{(Eq. 50)}$$

The role of $W_2$ and $W_3$ can be to co-phase the vertical elements and different polarizations by applying a block diagonal phase rotation. The structure above can allow for arbitrary co-phasing between the subarrays comprising different vertical elements and polarizations. The subarrays can include co-polarized subarrays with antenna elements of the same polarization. However, such a general structure may make both the codebook design and precoder selection at the UE difficult. The design can be simplified by applying some restrictions to the co-phasing matrix $W_2$ as follows:

The submatrices $A_2, \ldots, A_{N_V}$ determine the co-phasing as applied to the vertical elements with +45 degree polarization. Similarly, the submatrices $A_{N_V+1}, \ldots, A_{2N_V}$ determine the co-phasing as applied to the vertical elements with −45 degree polarization. One restriction can be to set $A_k = I_p$; $2 \le k \le N_V$ and $$A_k = \begin{bmatrix} \alpha_1 & & & \\ & \alpha_2 & & \\ & & \ddots & \\ & & & \alpha_p \end{bmatrix}; N_V + 1 \le k \le 2N_V. \quad \text{(Eq. 51)}$$

Similarly, $B_k = I_p$; $2 \le k \le N_V$ and $$B_k = \begin{bmatrix} \beta_1 & & & \\ & \beta_2 & & \\ & & \ddots & \\ & & & \beta_p \end{bmatrix}; N_V + 1 \le k \le 2N_V. \quad \text{(Eq. 52)}$$

If $1 \le p \le 4$, is chosen, these restrictions allow the $W_2$ codebook to be encoded in terms of at most 4 unit-modulus complex-valued parameters. For a final structure with restrictions:

According to the above determinations, the final structure becomes:

For Decomposition 1, $$W_{dp} = \begin{bmatrix} u_1 \otimes v_1 & u_2 \otimes v_2 & \cdots & u_p \otimes v_p \\ \alpha_1 u_1 \otimes v_1 & \alpha_2 u_2 \otimes v_2 & \cdots & \alpha_p u_p \otimes v_p \end{bmatrix} \Lambda_{p \times r} \quad \text{(Eq. 53)}$$

In the product form, this can be written as $$W_{dp} = \underbrace{(I_{2N_V} \otimes [\begin{array}{cccc} v_1 & v_2 & \cdots & v_p \end{array}])}_{W_1} \quad \text{(Eq. 54)}$$

$$\underbrace{\left[ I_2 \otimes \begin{bmatrix} I_p & & & \\ & P & & \\ & & \ddots & \\ & & & P^{N_V-1} \end{bmatrix} \right]}_{W_3} \underbrace{\begin{bmatrix} I_p \\ I_p \\ \vdots \\ I_p \\ A_{N_V+1} \\ A_{N_V+1} \\ \vdots \\ A_{N_V+1} \end{bmatrix}}_{W_2} \Lambda_{p \times r}$$

where $A_{N_V+1} = \begin{bmatrix} \alpha_1 & & & \\ & \alpha_2 & & \\ & & \ddots & \\ & & & \alpha_p \end{bmatrix}$.

For Decomposition 2, $$W_{dp} = \begin{bmatrix} u_1 \otimes v_1 & u_2 \otimes v_2 & \cdots & u_p \otimes v_p & u_1 \otimes v_1 & u_2 \otimes v_2 & \cdots & u_p \otimes v_p \\ \alpha_1 u_1 \otimes v_1 & \alpha_2 u_2 \otimes v_2 & \cdots & \alpha_p u_p \otimes v_p & \beta_1 u_1 \otimes v_1 & \beta_2 u_2 \otimes v_2 & \cdots & \beta_p u_p \otimes v_p \end{bmatrix} \Lambda_{2p \times r} \quad \text{(Eq. 55)}$$

where $$u_k = \begin{bmatrix} 1 \\ e^{j\phi_k} \\ \vdots \\ e^{j(N_V-1)\phi_k} \end{bmatrix}. \quad \text{(Eq. 56)}$$

In product form, this can be written as $$W_{dp} = \underbrace{(I_{2N_V} \otimes [\begin{matrix} v_1 & v_2 & \cdots & v_P \end{matrix}])}_{W_1} \quad \text{(Eq. 57)}$$

$$\underbrace{\left[ I_2 \otimes \left[ \begin{matrix} I_P & & & \\ & P & & \\ & & \ddots & \\ & & & P^{N_V-1} \end{matrix} \right] \right]}_{W_3} \underbrace{\left[ \begin{matrix} I_P & I_P \\ I_P & I_P \\ \vdots & \vdots \\ I_P & I_P \\ A_{N_V+1} & B_{N_V+1} \\ A_{N_V+1} & B_{N_V+1} \\ \vdots & \vdots \\ A_{N_V+1} & B_{N_V+1} \end{matrix} \right]}_{W_2} A_{p \times r}$$

where $B_{N_V+1} = \left[ \begin{matrix} \beta_1 & & & \\ & \beta_2 & & \\ & & \ddots & \\ & & & \beta_P \end{matrix} \right]$.

Setting $N_V=1$ results in a Release 10 precoder that has been commonly designed for ULA and dual-polarized arrays.

In the above decompositions, as before, the matrix $W_1$ is determined, at least partially, by the codebook index $i_1$ and can correspond to the grid of beams component of the precoder based on an oversampled DFT matrix. With the restrictions mentioned above, the role of $W_2$ can be to co-phase the cross pole antennas whereas $W_3$ takes care of vertical beamforming within the set of vertical elements with the same polarization. The Release 10 codebook can be extended in such a way that $W_2$ is determined by an codebook index $i_2$. The role of $W_3$ can be to apply phase rotation to the vertical elements so as to point a layer in a desired direction or vertical/elevation angle. A new codebook to span the relevant set of vertical angles, preferably using non-uniform quantization, can be determined by a new codebook index $i_3$. The relevant set of vertical angles can be predetermined and known apriori to the eNB and UE or can be signaled by the eNB 110. A UE capable of supporting vertical/elevation beamforming, may be configured by higher layer signaling to use a codebook supporting vertical/elevation beamforming. In one embodiment, the eNB 120 may signal to the UE 110 an indication of a list of possible vertical angles. The signaling of the list of possible vertical angles may be an explicit list of possible vertical angles, an indicator to one of predetermined vertical angle sets, indication to the [minimum, maximum, and step size] value for the possible vertical angles, a bitmap with each bit set to one indicating a predetermined vertical angle to be included in the possible vertical angle list, etc. In one embodiment, the vertical beamforming component of the codebook may be designed over a set of vertical angles which are a priori known to the UE 110 and eNB 120. The UE 110 may be configured with a codebook subset restriction to restrict the possible precoders for CSI feedback to include a subset of the vertical angles.

While $W_1$ matches the precoding vector space $[v_1\ v_2 \ldots v_P]$ to the wideband spatial transmit covariance structure of the channel matrix, $W_3$ matches the transmit phases to the vertical angle of departure of the rays associated with transmit array, i.e., vertical beamforming. Thus, it can be sufficient for the UE 110 to send a wideband $W_3$, such as one $W_3$ matrix common to all subbands. Further, change of spatial covariance structure, and therefore, $W_1$, may also be associated with change in UE location and may cause a change in $W_3$. Since the vertical angle changes at the same or a much slower rate than the spatial covariance structure, the rate of feedback for $i_3$ may not be any faster than that for $i_1$.

Table 2 illustrates an example of the properties of feedback for precoding matrices $W_1$, $W_2$, and $W_3$.

TABLE 2

| Precoding matrix | Function | Wideband or subband | Index feedback rate |
|---|---|---|---|
| $W_1$ | Match spatial covariance structure | Wideband | Once every 50-200 ms |
| $W_2$ | Co-phasing across polarizations | Per subband | 2-20 ms (tracks fast fading) |
| $W_3$ | Vertical beamforming | Wideband | Once every 50-200 ms |

Thus, for a grid of beams, the UE 110 can receive a set of CSI-RS associated with one or more CSI-RS resources. The UE 110 can then determine a precoding matrix ($W_{dp}$) based on the received set of CSI-RS. The precoding matrix $W_{dp}$ can have a representation in terms of three components. The first component can be determined from a first set of vectors $[v_1\ v_2\ \ldots\ v_P]$, where $v_k$ can be from the columns of an oversampled DFT matrix. An oversampled DFT matrix can be a generator matrix $G^{(Q)}$ having elements $$[G^{(Q)}]_{mn} = \exp\left(j\frac{2\pi mn}{Q}\right), q = 1, 2, 3, \ldots , \quad \text{(Eq. 58)}$$

where Q is an integer that may be related to the number of transmit antennas.

The second component can be determined from a first set of parameters ($\{\alpha_k\}_{k=1}^P$ and/or $\{\beta_k\}_{k=1}^P$). The third component can determined from a second set of parameters ($\phi_k$'s that determine $u_k=[1\ e^{j\Phi_k} \ldots e^{j(N_V-1)\Phi_k}]$). The notation $(\bullet)^T$ denotes a vector or matrix transpose operation. The UE 110 can then transmit a representation or partial representation of the first component, and/or the second component, and/or the third component.

The precoder can be represented as a product of three component matrices, $W_1$, $W_2$, and $W_3$ (as shown in Eqs. 46 and 49 for example). The first component matrix ($W_1$) can be determined from the first component. In other words, $[v_1\ v_2\ \ldots\ v_P]$ determines the first component which in turn determines the first matrix $W_1 = I_{2N_V} \otimes [v_1\ v_2\ \ldots\ v_P]$. The second component matrix ($W_2$) can be determined from the second component. The third component matrix ($W_3$) can be determined from the third component. Also, the first component matrix ($W_1$) can at least be represented as a Kronecker product, $I_{2N_V} \otimes [v_1\ v_2\ \ldots\ v_P]$, of an identity matrix and a matrix with columns from an over-sampled DFT matrix.

The second component matrix ($W_2$) can have the form (for Decomposition 1):

$$W_2 = \begin{bmatrix} I_p \\ A_2 \\ \vdots \\ A_M \\ A_{M+1} \\ A_{M+2} \\ \vdots \\ A_{2M} \end{bmatrix} \quad \text{(Eq. 59)}$$

where $A_m$'s are diagonal matrices. The diagonal matrix $A_m$ can have the form:

$$A_m = \begin{bmatrix} \alpha_1 & & & \\ & \alpha_2 & & \\ & & \ddots & \\ & & & \alpha_p \end{bmatrix} \quad \text{(Eq. 60)}$$

where $|\alpha_k|=1$.

The second component matrix ($W_2$) can have the form (for Decomposition 2):

$$W_2 = \begin{bmatrix} I_p & I_p \\ A_2 & B_2 \\ \vdots & \vdots \\ A_M & B_M \\ A_{M+1} & B_{M+1} \\ A_{M+2} & B_{M+2} \\ \vdots & \vdots \\ A_{2M} & B_{2M} \end{bmatrix} \quad \text{(Eq. 61)}$$

where $A_m$'s and $B_m$'s can be diagonal matrices. The third component matrix ($W_3$) can be determined by a diagonal matrix of the form:

$$P = \begin{bmatrix} e^{j\phi_1} & & & \\ & e^{j\phi_2} & & \\ & & \ddots & \\ & & & e^{j\phi_p} \end{bmatrix}. \quad \text{(Eq. 62)}$$

Table 3 below shows an example of a rank 2 precoder codebook based on this structure that can be used for an antenna grid with 2M rows and 4 columns (e.g., each column may comprise M cross-pole antennas) with a total of 8M antenna elements. The inter-element spacing in each column may be assumed to be $4\lambda$.

TABLE 3

Codebook for 2-layer CSI reporting using antenna ports 15 to (14 + 8M)

| $i_1$ | $i_2$ = 0 | 1 | 2 | 3 |
|---|---|---|---|---|
| 0-15 | $W^{(2)}_{2i_1,2i_1,0,r,s}$ | $W^{(2)}_{2i_1,2i_1,1,r,s}$ | $W^{(2)}_{2i_1+1,2i_1+1,0,r,s}$ | $W^{(2)}_{2i_1+1,2i_1+1,1,r,s}$ |

| $i_1$ | $i_2$ = 4 | 5 | 6 | 7 |
|---|---|---|---|---|
| 0-15 | $W^{(2)}_{2i_1+2,2i_1+2,0,r,s}$ | $W^{(2)}_{2i_1+2,2i_1+2,1,r,s}$ | $W^{(2)}_{2i_1+3,2i_1+3,0,r,s}$ | $W^{(2)}_{2i_1+3,2i_1+3,1,r,s}$ |

| $i_1$ | $i_2$ = 8 | 9 | 10 | 11 |
|---|---|---|---|---|
| 0-15 | $W^{(2)}_{2i_1,2i_1+1,0,r,s}$ | $W^{(2)}_{2i_1,2i_1+1,1,r,s}$ | $W^{(2)}_{2i_1+1,2i_1+2,0,r,s}$ | $W^{(2)}_{2i_1+1,2i_1+2,1,r,s}$ |

| $i_1$ | $i_2$ = 12 | 13 | 14 | 15 |
|---|---|---|---|---|
| 0-15 | $W^{(2)}_{2i_1,2i_1+3,0,r,s}$ | $W^{(2)}_{2i_1,2i_1+3,1,r,s}$ | $W^{(2)}_{2i_1+1,2i_1+3,0,r,s}$ | $W^{(2)}_{2i_1+1,2i_1+3,1,r,s}$ | where $W^{(2)}_{m,m',n,r,s} = \dfrac{1}{4}\begin{bmatrix} u_r \otimes v_m & u_s \otimes v_{m'} \\ \phi_n u_r \otimes v_m & -\phi_n u_s \otimes v_{m'} \end{bmatrix}$ where $v_m = v^{(m)} = [1 \; e^{j2\pi m/32} \; e^{j4\pi m/32} \; e^{j6\pi m/32}]^T$, $\phi_n = e^{j\pi n/2}$, and $u_r = [1, e^{j8\pi \sin\theta_r}, \ldots, e^{j(M-1)8\pi \sin\theta_r}]^T$ is based on a 3-bit index $i_3$ feedback such that (Note: $(\pi/2)/8 = 11.25$ degrees). An example is shown in Table 4.

TABLE 4

| $i_3$ | $\theta_r$ (or $\theta_s$) (degrees) |
|---|---|
| 0 | 0 |
| 1 | 11.25 |
| 2 | 22.5 |
| 3 | 37.75 |
| 4 | 45 |
| 5 | 56.25 |
| 6 | 67.5 |
| 7 | 78.75 |

The vertical beamforming information with the above codebook can be contained in 3 bits for $i_3$ feedback for each spatial layer.

When the UE computes feedback assuming SU-MIMO transmission, the codebook above may have the constraint that $u_r = u_s$. The UE sends a 3-bit $i_3$ under this constraint.

The codebook elements, for Decomposition Type 1, can be written as the product $W_1 W_3 W_2$ as shown below.

$$W = \underbrace{(I_{2M} \otimes [v_m \; v_{m'}])}_{W_1} \underbrace{\left[ I_2 \otimes \begin{bmatrix} I_p & & & \\ & P & & \\ & & \ddots & \\ & & & P^{M-1} \end{bmatrix} \right]}_{W_3} \underbrace{\begin{bmatrix} I_p \\ A_2 \\ \vdots \\ A_M \\ A_{M+1} \\ A_{M+2} \\ \vdots \\ A_{2M} \end{bmatrix}}_{W_2} A_{p \times r} \quad \text{(Eq. 63)}$$

where $p=2$, $I_p$ is a (p×p) identity matrix, $$P = \begin{bmatrix} e^{j8\pi \sin\theta_r} & 0 \\ 0 & e^{j8\pi \sin\theta_s} \end{bmatrix}, \quad \text{(Eq. 64)}$$

$$A_2 = \ldots = A_M = I_2, \quad \text{(Eq. 65)}$$

$$A_{M+1} = \ldots = A_{2M} = \begin{bmatrix} \phi_n & 0 \\ 0 & -\phi_n \end{bmatrix}. \quad \text{(Eq. 66)}$$

For the rank 2 case where the UE computes feedback assuming MU-MIMO transmission (e.g., Multi-user CQI or MU-CQI), a total of 6 bits (i.e., two indexes $i_3$) may be necessary.

At least a partial representation of the first component matrix ($W_1$) can be a first codebook index ($i_1$). The first codebook index ($i_1$) and the second codebook index ($i_2$) may be a complete representation of the first component matrix ($W_1$). A representation of the second component matrix ($W_2$) can be a second codebook index ($i_2$), and a representation of the third component matrix ($W_3$) can be a third codebook index ($i_3$). The first, second, and third indexes (or in some examples subset of indexes such as first and third indexes) can jointly point to an element or precoder of a codebook. Also, the first and second indexes can point to an element or precoder of a codebook (the precoder indicated by only the first and second indexes may not depend on the third codebook index).

In one embodiment, the UE 110 is configured with a CSI process for generating CSI feedback. The CSI process is associated with the generation of one set of CSI which can include PMI, RI, and/or CQI, based on an associated one or more CSI-RS resource(s) (for which the UE assumes non-zero transmission power for the CSI-RS) and one or more interference measurement resource. The PMI may correspond to the first codebook index ($i_1$), the second codebook index ($i_2$) and third codebook index ($i_3$). The CSI-RS antenna ports corresponding to the CSI-RS resource(s) is associated to one or more antenna elements of an antenna array. The UE 110 may determine the RI, CQI, the first codebook index ($i_1$), the second codebook index ($i_2$) and third codebook index ($i_3$) based on the CSI-RS received on the CSI-RS antenna ports corresponding to the CSI-RS resource(s) associated with the CSI process. The PMI and thus the first codebook index ($i_1$), the second codebook index ($i_2$) and third codebook index ($i_3$) are conditioned on the most recent RI. The CQI is conditioned on the most recent PMI. The UE 110 may be configured with periodic CSI reporting. The UE may be configured with two reporting instances (first and second reporting instance) each with its own periodicities (first and second periodicity) for reporting on set of CSI comprising CQI/PMI/RI. The first reporting instance may be in a first uplink subframe and the second reporting instance may be in a second uplink subframe. The first uplink subframe, and the second uplink subframe can occur at different times. The first and second periodicities may be different.

In one example, the UE may be configured for wideband CQI/wideband PMI periodic reporting. In one mode of operation, the UE may transmit a first CSI report including RI and a first PMI, the first PMI being a representation of the third codebook index ($i_3$), on the first reporting instances with the first periodicity. The RI and the first PMI may be separately encoded (e.g. mapped to different set of bits in a message) or jointly encoded. In some cases, the third codebook index ($i_3$) may be sub-sampled (i.e., only certain specified values or a subset of the possible values are available to select from) to fit within the available number of bits for the first CSI report. The UE 110 may transmit a second CSI report including the wideband CQI and second PMI, the second PMI being a representation of the first codebook index ($i_1$) and the second codebook index ($i_2$), on the second reporting instances with the second periodicity. The wideband CQI and the second PMI may be separately or jointly encoded. Alternatively, the UE 110 may transmit a second CSI report including the wideband CQI, second PMI (the second PMI being a representation of the first codebook index ($i_1$)), and third PMI (the third PMI being a representation of the second codebook index ($i_2$)), on the second reporting instances with the second periodicity. The wideband CQI, second PMI and the third PMI may be separately or jointly encoded. In some cases, the first codebook index ($i_1$) and/or the second codebook index ($i_2$) may be sub-sampled (i.e., only certain specified values or a subset of the possible values are available to select from) to fit within the available number of bits for the second CSI report.

In another configured mode of operation, the UE may transmit a first CSI report including RI and a first PMI, the first PMI being a representation of the first codebook index ($i_1$) and the third codebook index ($i_3$), on the first reporting instances with the first periodicity. The RI and the first PMI may be separately encoded (e.g. mapped to different set of bits in a message) or jointly encoded. In some cases, the first codebook index ($i_1$) and/or the third codebook index ($i_3$) may be sub-sampled (i.e., only certain specified values or a subset of the possible values are available to select from) to fit within the available number of bits for the first CSI report. The UE 110 may transmit a second CSI report including the wideband CQI and second PMI, the second PMI being a representation of the second codebook index ($i_2$), on the second reporting instances with the second periodicity. The wideband CQI and the second PMI may be separately or jointly encoded. In some cases, the second codebook index ($i_2$) may be sub-sampled (i.e., only certain specified values or a subset of the possible values are available to select from) to fit within the available number of bits for the second CSI report.

In another mode of operation, the UE may transmit a first CSI report including RI on the first reporting instances with the first periodicity. The UE 110 may transmit a second CSI report including the wideband CQI and PMI, the PMI being a representation of the first codebook index ($i_1$), the second codebook index ($i_2$), and the third codebook index ($i_3$), on the second reporting instances with the second periodicity. The wideband CQI and the PMI may be separately or jointly encoded. In some cases, the first codebook index ($i_1$), the second codebook index ($i_2$), and/or the third codebook index ($i_3$) may be sub-sampled (i.e., only certain specified values or a subset of the possible values are available to select from) to fit within the available number of bits for the second CSI report. In one embodiment, The UE 110 may be signaled an operation mode from a set of modes (including one or more modes described above) by the base station 120. The different modes can exploit the feedback rates described in Table 2 above and tradeoff the subsampling impacts of the codebook index(es) and provide mechanisms to minimize the uplink overhead for CSI feedback.

In another example, the UE may be configured for suband CQI/PMI periodic reporting. In one mode of operation, the UE may determine a Precoder Type Indicator (PTI) and transmit a first CSI report including RI and the PTI on the first reporting instances with the first periodicity. The RI and the PTI may be separately or jointly encoded. The UE 110 uses the PTI to indicate the contents of the CSI reports on the second reporting instances with the second periodicity until the next RI+PTI report. If the most recent transmitted PTI is set to '0' (first state) or '2' (third state), the UE 110 transmits a second CSI report on a subset of the second reporting instances with a third periodicity (e.g., third periodicity=k*second periodicity, k being an integer). If the most recent transmitted PTI is set to '0', the second CSI report includes a first PMI, the first PMI being a representation of the first codebook index ($i_1$). If the most recent transmitted PTI is set to '2', the second CSI report includes a second PMI, the second PMI being a representation of the third codebook index ($i_3$). Between every two consecutive first/second PMI reports on the second reporting instances with the second periodicity, the UE 110 transmits a third CSI report including a wideband CQI and a third PMI assuming transmission on a wideband channel bandwidth, the third PMI being a representation of the second codebook index ($i_2$). In case of CSI report collision due to UE configured with multiple carriers (carrier aggregation) or multiple serving cells, the UE transmits a CSI report of only one serving cell with the CSI report including only the representation of the first codebook index ($i_1$) or representation of the third codebook index ($i_3$) have higher priority that other CSI reports including at least CQI which are dropped.

If the most recent transmitted PTI is set to '1' (second state), the UE 110 transmits the second CSI report on a subset of the second reporting instances with a fourth periodicity (e.g., fourth periodicity=m*second periodicity, m being an integer), the second CSI report including the wideband CQI and the third PMI, the third PMI being a representation of the second codebook index ($i_2$) assuming transmission on a wideband channel bandwidth. The fourth periodicity can be different than the third periodicity. Between every two consecutive wideband CQI/wideband third PMI reports on the second reporting instances with the second periodicity, the UE 110 transmits a fourth CSI report including a subband CQI and a fourth PMI assuming transmission on a subband channel bandwidth, the fourth PMI being a representation of the second codebook index ($i_2$). Thus, with the use of PTI, in scenarios where first codebook index ($i_1$) and third codebook index ($i_3$) are not changing, subband feedback of the second codebook index ($i_2$) and associated CQI can be achieved which can improve UE throughput performance.

In an alternate example, if the most recent transmitted PTI is set to '0' (first state) the UE 110 transmits a second CSI report on a subset of the second reporting instances with a third periodicity (e.g., third periodicity=k*second periodicity, k being an integer). The second CSI report includes a first PMI and a second PMI, the first PMI being a representation of the first codebook index ($i_1$), and the second PMI being a representation of the third codebook index ($i_3$). Between every two consecutive first and second PMI reports on the second reporting instances with the second periodicity, the UE 110 transmits a third CSI report including a wideband CQI and a third PMI assuming transmission on a wideband channel bandwidth, the third PMI being a representation of the second codebook index ($i_2$). The UE 110 behavior if the most recent transmitted PTI is set to '1' (second state), is same as described in the previous mode of the operation above. In case of CSI report collision due to UE configured with multiple carriers (carrier aggregation) or multiple serving cells, the UE transmits a CSI report of only one serving cell with the CSI report including the representation of the first codebook index ($i_1$) and the representation of the third codebook index ($i_3$) have higher priority that other CSI reports including at least CQI which are dropped.

In another embodiment, the UE 110 is configured with a CSI process that is associated with two CSI-RS resources. A first CSI-RS resource associated with the CSI process comprises a first set of CSI-RS antenna ports corresponding to vertically aligned antenna elements in a column of the antenna array, and a second CSI-RS resource associated with the CSI process comprises a second set of CSI-RS antenna ports corresponding to horizontally aligned antenna elements in a row of the antenna array. The UE 110 may determine the third codebook index ($i_3$) based on the CSI-RS received on the first set of CSI-RS antenna ports, and determine the first codebook index ($i_1$) and the second codebook index ($i_2$) based on the CSI-RS received on the second set of CSI-RS antenna ports. The UE behavior with periodic CSI reporting is same as described. The UE 110 may assume the antenna ports associated with the first CSI-RS resource and the second CSI-RS resource are quasi co-located with respect to one or more of delay spread, Doppler spread, Doppler shift, average gain, and average delay. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay.

In another embodiment, the UE 110 is configured with two CSI processes. A first CSI-RS resource associated with the first CSI process comprises a first set of CSI-RS antenna ports corresponding to vertically aligned antenna elements in a column of the antenna array, and a second CSI-RS resource associated with the second CSI process comprises a second set of CSI-RS antenna ports corresponding to horizontally aligned antenna elements in a row of the antenna array. The UE 110 may be configured to determine the third codebook index ($i_3$) (and thus the vertical/elevation beamforming component) based on the first CSI process and CSI-RS received on the first set of CSI-RS antenna ports, and determine the first codebook index ($i_1$) and the second codebook index ($i_2$) based on the determined third codebook index ($i_3$) from the first CSI process and CSI-RS received on the second set of CSI-RS antenna ports associated with the second CSI process. The UE's second CSI process is thus configured to use the first CSI process as a reference for the vertical/elevation beamforming third codebook index ($i_3$). The UE 110 may assume the antenna ports associated with the first CSI-RS resource of the first CSI process and the second CSI-RS resource of the second CSI process are quasi co-located with respect to one or more of delay spread, Doppler spread, Doppler shift, average gain, and average delay.

According to another embodiment, the UE 110 can receive a first CSI-RS configuration to enable UE feedback for assisting elevation beamforming, and a plurality of second CSI-RS configurations to enable UE feedback for assisting azimuth beamforming. The CSI-RS can correspond to a second CSI-RS configuration of the plurality of second CSI-RS configurations based on a candidate, such as elevation precoding matrix, $p_c$, where the candidate precoding matrix, $p_c$ can be different for each of the second CSI-RS configurations. The UE 110 can determine a first precoding matrix (p) based on a received first set of channel state information reference signals (CSI-RS) corresponding to the first CSI-RS configuration. The UE 110 can determine a preferred second CSI-RS configuration from the plurality of second CSI-RS configurations based on the determined first precoding matrix (p). The UE 110 can determine a second precoding matrix (P) based on received second set of channel state information reference signals (CSI-RS) corresponding to the determined preferred second CSI-RS configuration. The UE 110 can transmit an indication of the determined first precoding matrix (p), preferred second CSI-RS configuration, and/or second precoding matrix (P).

According to another embodiment, the UE 110 can receive a plurality of CSI-RS configurations to enable UE feedback for assisting azimuth beamforming. The CSI-RS can correspond to a CSI-RS configuration of the plurality of CSI-RS configurations associated with a candidate elevation direction. The candidate elevation direction corresponding to at least two of the plurality of CSI-RS configurations can be different. The UE 110 can determine a preferred CSI-RS configuration, and thus preferred elevation direction, from the plurality of CSI-RS configurations based on received CSI-RS corresponding to each of the plurality of CSI-RS configurations associated with the plurality of candidate elevation directions. The UE 110 can determine a precoding matrix (P) based on the received CSI-RS corresponding to the determined preferred CSI-RS configuration. The UE 110 can transmit an indication of the preferred CSI-RS configuration, such as a preferred elevation direction, and the determined precoding matrix (P).

Figure 5:
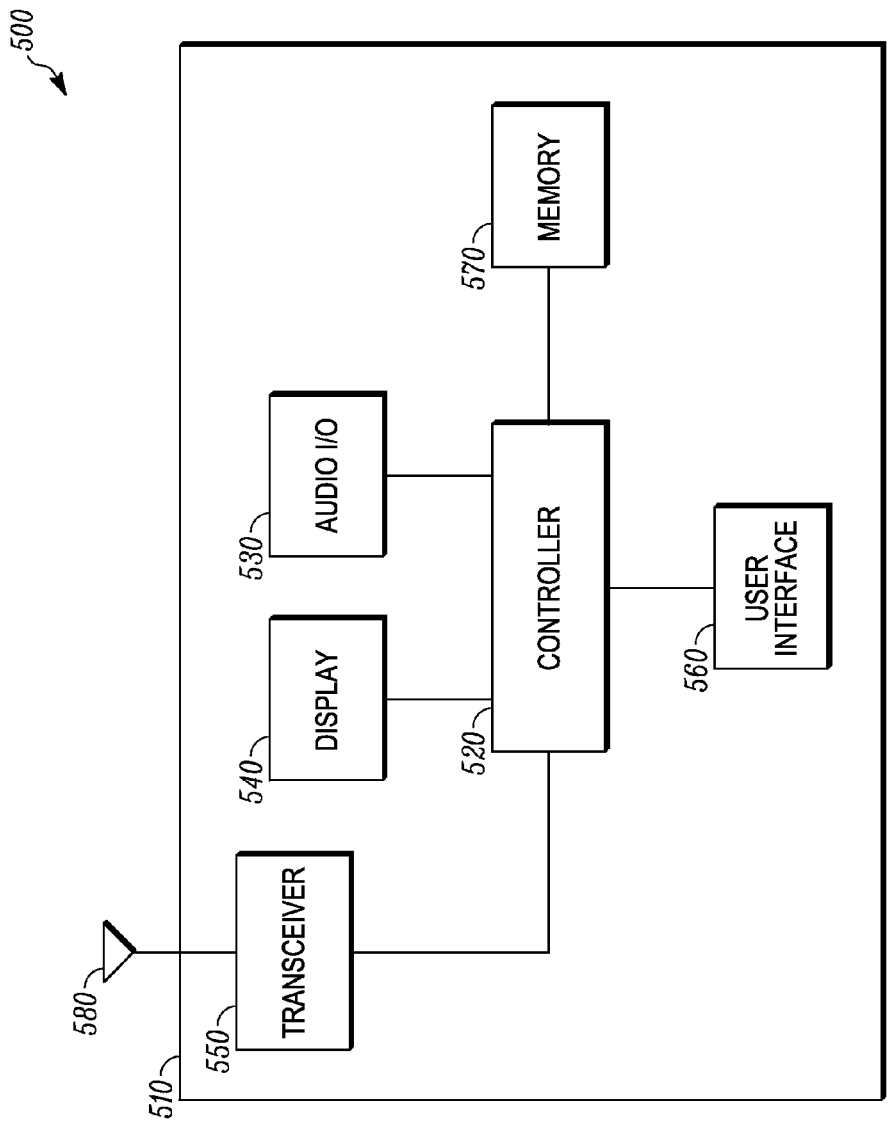
FIG. 5 is an example block diagram of a wireless communication device according to a possible embodiment.

FIG. 5 is an example block diagram of a wireless communication device 500, such as the UE 110, according to a possible embodiment. The wireless communication device 500 can include a housing 510, a controller 520 coupled to the housing 510, audio input and output circuitry 530 coupled to the housing 510, a display 540 coupled to the housing 510, a transceiver 550 coupled to the housing 510, a user interface 560 coupled to the housing 510, a memory 570 coupled to the housing 510, and an antenna 580 coupled to the housing 510 and the transceiver 550.

The display 540 can be a liquid crystal display (LCD), a light emitting diode (LED) display, a plasma display, a projection display, a touch screen, or any other device for displaying information. The transceiver 550 may include a transmitter and/or a receiver. The audio input and output circuitry 530 can include a microphone, a speaker, a transducer, or any other audio input and output circuitry. The user interface 560 can include a keypad, buttons, a touch pad, a joystick, a touch screen display, another additional display, or any other device useful for providing an interface between a user and an electronic device. The memory 570 can include a random access memory, a read only memory, an optical memory, a subscriber identity module memory, or any other memory that can be coupled to a wireless communication device. The wireless communication device 500 can perform the methods described in all the embodiments.

Figure 6:
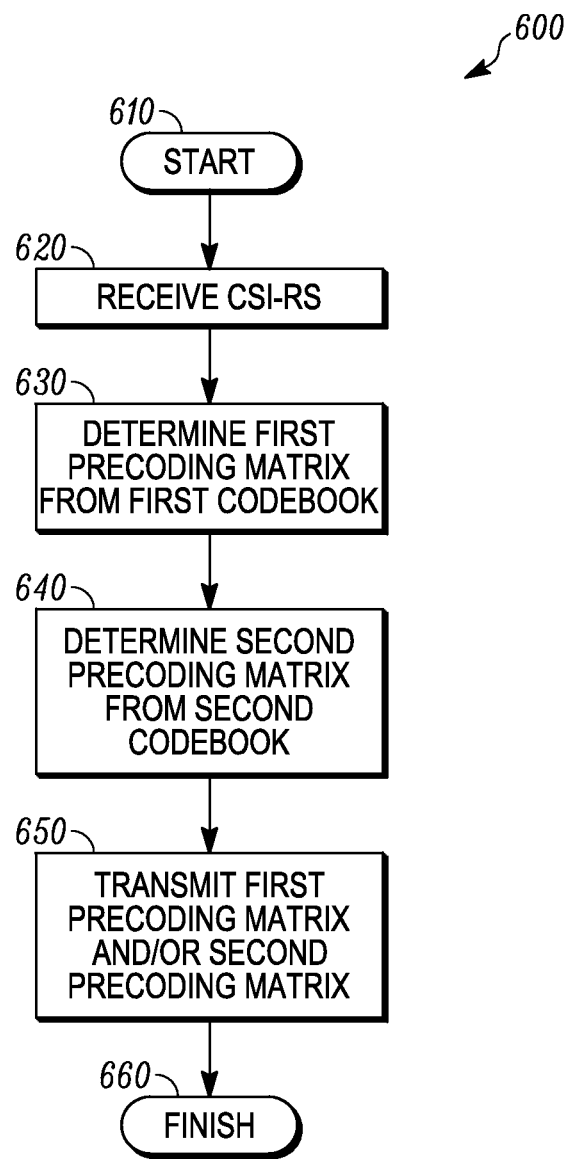
FIG. 6 is an example flowchart illustrating the operation of a wireless communication device according to a possible embodiment.

FIG. 6 is an example flowchart 600 illustrating the operation of the wireless communication device 500 according to a possible embodiment. At 610, the flowchart begins. At 620, the wireless communication device 500 can receive a first set of channel state information reference signals (CSI-RS) on resource elements and a second set of channel state information reference signals (CSI-RS) on resource elements. For example, the wireless communication device 500 can receive a configuration of the first set of channel state information reference signals (CSI-RS) and a configuration of the second set of channel state information reference signals (CSI-RS). The configuration of the first set of channel state information reference signals (CSI-RS) can correspond to the first set of channel state information reference signals (CSI-RS) and the configuration of the second set of channel state information reference signals (CSI-RS) can correspond to the second set of channel state information reference signals (CSI-RS). The first set of CSI-RS is thus associated with a first CSI-RS resource configuration and the second set of CSI-RS is thus associated with a second CSI-RS resource configuration. The wireless communication device 500 may be configured with a CSI process and the CSI process can be associated with both the first CSI-RS resource configuration and the second CSI-RS resource configuration. Alternately, the wireless communication device 500 may be configured with two CSI processes, the first CSI process associated with the first CSI-RS resource configuration and the second CSI process associated with the second CSI-RS resource configuration. The first set of channel state information reference signals (CSI-RS) can be different from the second set of channel state information reference signals (CSI-RS). Also, the first set of channel state information reference signals (CSI-RS) can be the same as the second set of channel state information reference signals (CSI-RS).

Each channel state information reference signal (CSI-RS) of the first set of channel state information reference signals (CSI-RS) can be associated with a corresponding channel state information reference signal (CSI-RS) antenna port. Each channel state information reference signal (CSI-RS) antenna port can be representative of one or more vertically aligned antenna elements of a multi-column antenna array. Each column in the multi-column antenna array can include a plurality of antenna elements.

At 630, the wireless communication device 500 can determine a first precoding matrix (p) based on the received first set of channel state information reference signals (CSI-RS). The first precoding matrix (p) can be chosen from a first codebook ($C_V$). The first codebook ($C_V$) can include selection vectors.

Each selection vector can indicate one of a preferred channel state information reference signal (CSI-RS) from the first set of channel state information reference signals (CSI-RS).

At 640, the wireless communication device 500 can determine a second precoding matrix (P) based on the second set of channel state information reference signals (CSI-RS). The second precoding matrix (P) can be chosen from a second codebook ($C_H$) that is different than the first codebook. The second precoding matrix (P) can also be determine based on the first precoding matrix (p) and the second set of channel state information reference signals (CSI-RS). The second set of channel state information reference signals (CSI-RS) can be based on the first precoding matrix (p).

For example, the base station 120 can transmit a first CSI-RS with each vertically aligned antenna element in a column in an antenna array at the base station 120. The UE 110 can determine a precoding matrix (p) from the first CSI-RS and can send the precoding matrix (p) back to the base station 120. The base station 120 can apply the precoding matrix (p) to each column in the antenna array. The base station 120 can then transmit a second CSI-RS from each column of antennas using the precoding matrix (p). The UE 110 can receive the second CSI-RS and can determine the precoding matrix (P) based on the second CSI-RS.

At 650, the wireless communication device 500 can transmit a representation of at least one of the first precoding matrix (p) and the second precoding matrix (P). The wireless communication device 500 can transmit a channel state information (CSI) report including the representation of at least one of the first precoding matrix (p) and second precoding matrix (P). The channel state information (CSI) report can include one or more of rank indication (RI) and channel quality indicator (CQI) information for one or more spatial layers. The channel quality indicator (CQI) for one or more spatial layers can be conditioned on the determined first precoding matrix (p) and second precoding matrix (P). For example, a spatial layer can carry one stream of data symbols that are transmitted by one or more antennas. When multiple streams of data symbols get mapped to the same set of REs, each component stream of data symbols is denoted as a spatial layer. The transmission rank can be the number of spatial layers. The CQI for the spatial layer can indicate how well the spatial layer can be received and is expressed in terms of the maximum transmission rate of symbols over the spatial layer that can be maintained with a specified level of reliability.

The wireless communication device 500 can also transmit a first channel state information (CSI) report including at least the representation of the first precoding matrix (p) in a first uplink subframe and a second channel state information (CSI) report including at least the second precoding matrix (P) in a second uplink subframe. The first uplink subframe can occur at a different time from the second uplink subframe. The first channel state information (CSI) report and the second channel state information (CSI) report can be transmitted periodically. The first and second channel state information (CSI) reports can also be transmitted with different periodicities. The wireless communication device 500 can transmit a representation of at least one of the first precoding matrix (p) and the second precoding matrix (P) over one of a Physical Uplink Shared Channel (PUSCH) and a Physical Uplink Control Channel (PUCCH). The wireless communication device 500 can also transmit channel state information (CSI), where the channel state information (CSI) can include both the first precoding matrix (p) and the second precoding matrix (P). At 560, the flowchart 600 ends.

Figure 7:
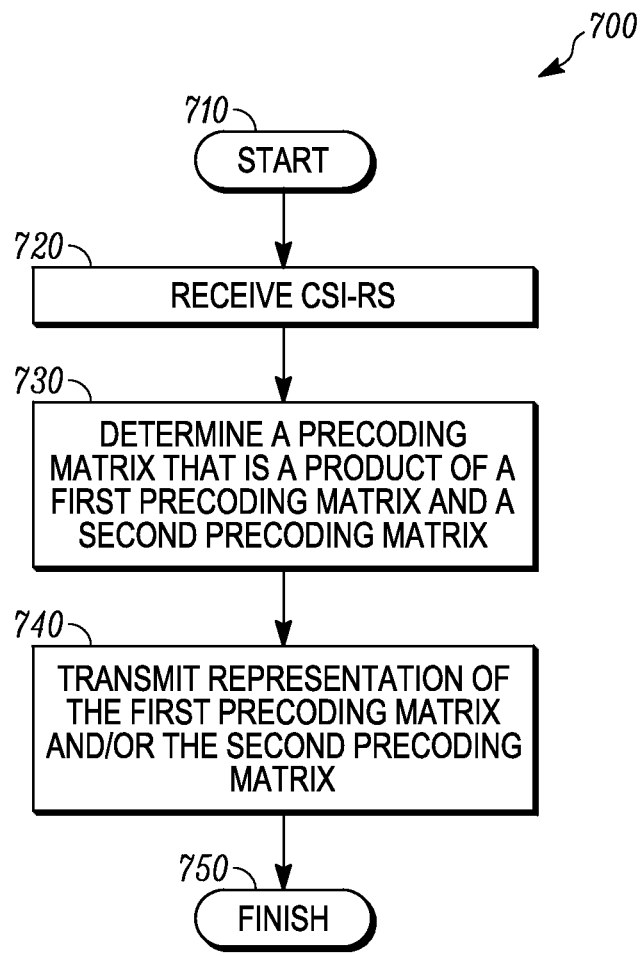
FIG. 7 is an example flowchart illustrating the operation of a wireless communication device according to a possible embodiment.

FIG. 7 is an example flowchart 700 illustrating the operation of the wireless communication device 500 according to a possible embodiment. At 710, the flowchart begins. At 720, a set of channel state information reference signals (CSI-RS) can be received at a wireless terminal, such as at the wireless communication device 500.

At 730, the wireless communication device 500 can determine, based on the received set of channel state information reference signals (CSI-RS), a precoding matrix that is a product of a first precoding matrix $P_V$ and a second precoding matrix $P_H$. The first precoding matrix $P_V$ can have at least a representation in terms of a representation matrix, $P_{V,k}$. The representation matrix $P_{V,k}$ can be based on a matrix ($p_k$) selected from a first codebook. According to another implementation, the first precoding matrix $P_V$ has at least a representation in terms of a plurality of N representation matrices, $P_{V,k}[1 \le k \le N]$. The second precoding matrix $P_H$ can be based on a second codebook.

According to one example implementation, the product of the first precoding matrix $P_V$ and the second precoding matrix $P_H$ is a matrix product. The plurality of N representation matrices are vertically stacked to form the first precoding matrix. A $k^{th}$ column of a $k^{th}$ representation matrix can be non-zero.

According to another implementation, the product is a matrix product $P_V P_H$. $P_{V,1}, P_{V,2}, \ldots, P_{V,N}$ are vertically stacked to form $P_V$, where $$P_V = \begin{bmatrix} P_{V,1} \\ \vdots \\ P_{V,N} \end{bmatrix} \quad \text{(Eq. 67)}$$

where $P_{V,k}$ is a matrix such that only a $k^{th}$ column is non-zero, where $P_V$ is the first precoding matrix, where $P_H$ is the second precoding matrix, and where $P_{V,1}, P_{V,2}, K, P_{V,N}$ are the plurality of N representation matrices. For example, the $k^{th}$ column can be equal to $p_k$. Thus, $$\begin{bmatrix} P_{V,1} \\ \vdots \\ P_{V,N} \end{bmatrix} = \begin{bmatrix} p_1 & \cdots & 0 \\ \vdots & \ddots & \vdots \\ 0 & \cdots & p_N \end{bmatrix} \quad \text{(Eq. 68)}$$

According to another example implementation, the product is a block-Kronecker product. The block-Kronecker product of two matrices can be a horizontal concatenation of a sequence of one or more matrix block products. Each of the two matrices is composed of a sequence of one or more horizontally concatenated matrix blocks. An $i^{th}$ matrix block product of the sequence of horizontally concatenated matrix blocks can be equal to a Kronecker matrix product of the $i^{th}$ matrix block of a first matrix of the two matrices and the $i^{th}$ matrix block of a second matrix of the two matrices. For example, a block-Kronecker product can comprise $$P_V * P_H = [P_V(:,1) \otimes P_H(:,1) P_V(:,2) \otimes P_H(:,2) \ldots$$
$$P_V(:,r) \otimes P_H(:,r)] \quad \text{(Eq. 69)}$$

where $P_V$ is the first precoding matrix, $P_H$ is the second precoding matrix, and r is the number of spatial layers. According to this example, $$P_V(:,k) = \begin{bmatrix} 1 \\ e^{j\phi_k} \\ \vdots \\ e^{j(M-1)\phi_k} \end{bmatrix} \quad \text{(Eq. 70)}$$

where k is an index that takes values from 1 through r.

According to another example implementation, the product of the first precoding matrix $P_V$ and the second precoding matrix $P_H$ is of the form $P_H P_V$, where $$P_H = \begin{bmatrix} q_1 & & 0 \\ & \ddots & \\ 0 & & q_M \end{bmatrix} \quad \text{(Eq. 71)}$$

where $P_V = 1_{M \times 1} \otimes p_1$, where $q_k$, k=1, 2, ..., M are vectors which belong to the second codebook, such as a horizontal precoding codebook, and where $1_{M \times 1}$ is a M×1 vector including all 1's. According to this example, $q_1 = \ldots q_M$. Further according to this example, let $\tilde{H}_V^{(k)}$ be the $N_r \times LM$ channel when horizontal precoding with the $k^{th}$ precoder, $q_k$, of the codebook is applied across each of the LM rows of the array:

$$\tilde{H}_V^{(k)} = [H_1 q_k \quad H_2 q_k \quad \ldots \quad H_{LM} q_k] \quad \text{(Eq. 72)}$$

The $N_r \times 1$ effective channel $h_e^{(k,p)}$ that includes both horizontal precoding by the $k^{th}$ horizontal precoder and vertical precoder p is then $$h_e^{(k,p)} = \tilde{H}_V^{(k)} p \quad \text{(Eq. 73)}$$

Similar to Case 2, the optimum vertical precoder can be obtained by maximizing over the expected channel $$\hat{p}_k = \arg\max_p E_{\tilde{H}_V^{(k)}} \|h_e^{(k,p)}\|^2 \quad \text{(Eq. 74)}$$

where $\hat{p}_k$ is the optimum vertical precoder corresponding to precoder k. The optimum horizontal precoder can then be obtained by maximizing over k:

$$\hat{k} = \max_k E \|h_e^{(k,\hat{p}_k)}\|^2 \quad \text{(Eq. 75)}$$

According to another example implementation, the product of the first precoding matrix $P_V$ and the second precoding matrix $P_H$ is of the form $P_H P_V$, where $$P_H = \begin{bmatrix} \begin{bmatrix} Q_1(:,1) & & 0 \\ & \ddots & \\ 0 & & Q_M(:,1) \end{bmatrix} & & 0 \\ & \ddots & \\ 0 & & \begin{bmatrix} Q_1(:,r) & & 0 \\ & \ddots & \\ 0 & & Q_M(:,r) \end{bmatrix} \end{bmatrix} \quad \text{(Eq. 76)}$$

where $P_V = [1 \otimes p_1 \ldots 1 \otimes p_r]$, where $[Q_k(:,1) \ldots Q_k(:,r)] := Q_k$ is an N×r matrix which belongs to the second codebook, such as a horizontal precoding codebook, and where $1_{M \times 1}$ is a M×1 vector having all 1's. According to this implementation, $$[Q_1(:,1) \ldots Q_1(:,r)] = \ldots = [Q_M(:,1) \ldots Q_M(:,r)] \quad \text{(Eq. 77)}$$

which can cover a case where the rank>1.

At 740, the wireless communication device 500 can transmit a representation of at least one of the first precoding matrix $P_V$ and the second precoding matrix $P_H$. The wireless communication device 500 can transmit a first channel state information report including at least the representation of the first precoding matrix ($P_V$) in a first uplink subframe and a second channel state information report including at least the second precoding matrix ($P_H$) in a second uplink subframe. The first uplink subframe can occur at a different time from the second uplink subframe. The first and second channel state information reports can be transmitted with different periodicities. Furthermore, the first channel state information report and the second channel state information report can be transmitted periodically. The wireless communication device 500 can transmit a representation of at least one of the first precoding matrix and the second precoding matrix over one of a Physical Uplink Shared Channel and a Physical Uplink Control Channel.

At 750, the flowchart 700 ends.

Figure 8:
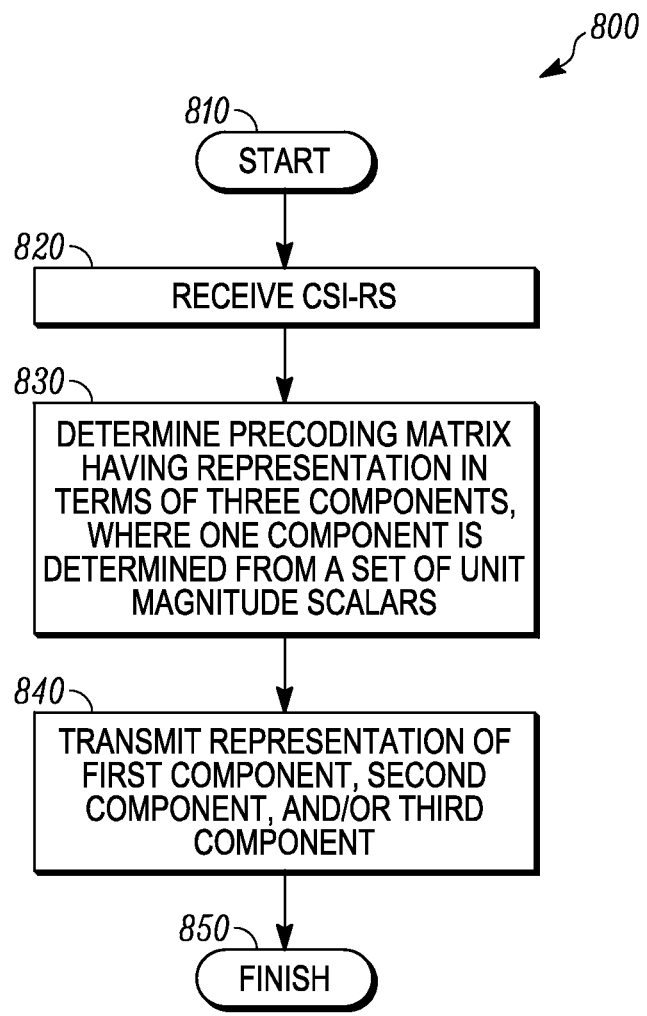
FIG. 8 is an example flowchart illustrating the operation of a wireless communication device according to a possible embodiment.

FIG. 8 is an example flowchart 800 illustrating the operation of the wireless communication device 500 according to a possible embodiment. At 810, the flowchart begins. At 820, a set of channel state information reference signals (CSI-RS) can be received at a wireless terminal, such as at the wireless communication device 500.

At 830, the wireless communication device 500 can determine a precoding matrix ($W_{dp}$) based on the received set of channel state information reference signals (CSI-RS). The precoding matrix ($W_{dp}$) can have a representation in terms of three components. The first component can be determined from a first set of vectors, $[v_1 \, v_2 \ldots v_p]$, where $v_k$, k=1, ..., p, and where p can be a number of vectors from a oversampled DFT matrix. The second component can be determined from a first set of parameters, such as $\{\alpha_1, \alpha_2, \ldots, \alpha_p\}$ or $\{\alpha_1, \alpha_2, \ldots, \alpha_p, \beta_1, \beta_2, \ldots, \beta_p\}$. The third component can be determined from a second set of parameters. The second set of parameters can be a set of unit-magnitude scalars, $\{e^{j\phi_1}, \ldots, e^{j\phi_p}\}$, where $$\phi\text{'s that determine } u = \begin{bmatrix} 1 \\ e^{j\phi} \\ \vdots \\ e^{j(M-1)\phi} \end{bmatrix} \quad \text{(Eq. 78)}$$

The phase of each unit-magnitude scalar can be related to the departure angle of a plane wave at a transmitting antenna array. A unit-magnitude scalar is a complex number with magnitude value of 1.

At least, a partial representation of the first component can be a first index ($i_1$). The first component may be completely determined by the first index ($i_1$) and a second index ($i_2$). A representation of the second component can be a second index ($i_2$), and a representation of the third component can be a third index ($i_3$). The first, second, and third indexes can jointly point to an element of a codebook. The first and second indexes can also point to an element of a codebook.

The precoding matrix can be at least represented as a product of three component matrices, $W_1$, $W_2$, and $W_3$. The first component matrix ($W_1$) can be determined from the first component. For example, the first set of vectors $[v_1 \, v_2 \ldots v_p]$ can determine the first component and the first component can determine the first precoding matrix as $W_1 = I_{2M} \otimes [v_1 \, v_2 \ldots v_p]$. The second component matrix ($W_2$) can be determined from the second component. The third component matrix ($W_3$) can be determined from the third component.

According to an example implementation, the first component matrix ($W_1$) is at least represented as a Kronecker product, $I_{2M} \otimes [v_1 \ v_2 \ldots v_p]$, of an identity matrix and a matrix with columns from an over-sampled Discrete Fourier Transform (DFT) matrix. The first component matrix ($W_1$) can be equal to $$I_{2M} \otimes [v_1 v_2 \ldots v_p] \quad \text{(Eq. 79)}$$

where $I_{2M}$ is a 2M×2M identity matrix, where $v_1, v_2, \ldots, v_p$ are the first set of vectors, where p is the number of vectors in the first set of vectors, and where M is an integer. The integer M can be related to the number of transmit antennas at the eNB 120. An $(m,n)^{th}$ entry of the oversampled DFT matrix can be represented as $$[G^{(Q)}]_{mn} = \exp\left(j\frac{2\pi}{Q}mn\right) \quad \text{(Eq. 80)}$$

where Q is an integer. The integer Q can be a function of the number of transmit antennas. For example, Q can be equal to a factor times the number of transmit antennas at the eNB 120.

According to another example implementation, the second component matrix is formed by vertically stacking an identity matrix and at least a first diagonal matrix. For example, the second component matrix has the form $$W_2 = \begin{bmatrix} I_p \\ A_2 \\ \vdots \\ A_M \\ A_{M+1} \\ A_{M+2} \\ \vdots \\ A_{2M} \end{bmatrix} \quad \text{(Eq. 81)}$$

where $I_P$ is an identity matrix, where $A_m$, m=2, ..., 2M are (p×p) diagonal matrices, where M is an integer, and where p is the number of vectors in the first set of vectors. The diagonal matrix $A_m$ can be of the form $$A_m = \begin{bmatrix} \alpha_1 & & & \\ & \alpha_2 & & \\ & & \ddots & \\ & & & \alpha_p \end{bmatrix} \quad \text{(Eq. 82)}$$

where $|\alpha_k|=1$.

According to another example implementation, the second component matrix is formed by horizontally stacking a first matrix column and a second matrix column. The first matrix column is formed by vertically stacking an identity matrix and at least a first diagonal matrix. The second matrix column is formed by vertically stacking an identity matrix and at least a second diagonal matrix. For example, the second component matrix can have the form $$W_2 = \begin{bmatrix} I_p & I_p \\ A_2 & B_2 \\ \vdots & \vdots \\ A_M & B_M \\ A_{M+1} & B_{M+1} \\ A_{M+2} & B_{M+2} \\ \vdots & \vdots \\ A_{2M} & B_{2M} \end{bmatrix} \quad \text{(Eq. 83)}$$

where $I_P$ is an identity matrix, where $A_m$, m=2, ..., 2M are (p×p) diagonal matrices, where $B_m$, m=2, ..., 2M are (p×p) diagonal matrices, where M is an integer, and where p is the number of vectors in the first set of vectors.

According to another example implementation, the third component matrix is determined by a diagonal matrix of the form $$P = \begin{bmatrix} e^{j\phi_1} & & & \\ & e^{j\phi_2} & & \\ & & \ddots & \\ & & & e^{j\phi_p} \end{bmatrix} \quad \text{(Eq. 84)}$$

The third component matrix can be equal to a Kronecker product of an identity matrix and a block diagonal matrix comprising an identity matrix and at least one integer power of the diagonal matrix P. For example, the third component matrix can be equal to $$I_2 \otimes \begin{bmatrix} I_p & & & \\ & P & & \\ & & \ddots & \\ & & & P^{M-1} \end{bmatrix} \quad \text{(Eq. 85)}$$

where M is an integer.

At 840, the wireless communication device 500 can transmit a representation or a partial representation of at least one of the first component, the second component, and the third component. For example, the wireless communication device 500 can transmit a first channel state information report including at least the partial representation of the first component in a first uplink subframe, a second channel state information report including at least the representation of the second component in a second uplink subframe, and a third channel state information report including at least the representation of the third component in a third uplink subframe. The first uplink subframe, the second uplink subframe, and the third uplink subframe can occur at different times. The first, second, and third channel state information reports can also be transmitted with different periodicities. Additionally, at least one the first channel state information report, the second channel state information report, and the third channel state information report can be transmitted periodically. The wireless communication device 500 can transmit the representation of the at least one of the first component, the second component, and the third component over one of a Physical Uplink Shared Channel and a Physical Uplink Control Channel.

At 850, the flowchart 800 can end.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
receiving, at a wireless terminal, a first set of channel state information reference signals on resource elements, and a second set of channel state information reference signals on resource elements;
determining, by the wireless terminal, a first precoding matrix based on the received first set of channel state information reference signals, where the first precoding matrix is chosen from a first codebook;
determining, by the wireless terminal, a second precoding matrix based on the second set of channel state information reference signals, where the second precoding matrix is chosen from a second codebook that is different than the first codebook; and
transmitting, by the wireless terminal, a representation of at least one of the first precoding matrix and the second precoding matrix;
wherein the second set of channel state information reference signals is based on the first precoding matrix.

2. The method of claim 1, wherein transmitting further comprises transmitting, by the wireless terminal, a channel state information report including the representation of at least one of the first precoding matrix and second precoding matrix.

3. The method of claim 2,
wherein the channel state information report further includes one or more of rank indication and channel quality indicator information for one or more spatial layers, and
wherein the channel quality indicator for one or more spatial layers is conditioned on the determined first precoding matrix and second precoding matrix.

4. The method of claim 1, wherein transmitting further comprises transmitting, by the wireless terminal, a first channel state information report including at least the representation of the first precoding matrix in a first uplink subframe and a second channel state information report including at least the second precoding matrix in a second uplink subframe.

5. The method of claim 4, wherein the first uplink subframe occurs at a different time from the second uplink subframe.

6. The method of claim 5, wherein the first and second channel state information reports are transmitted with different periodicities.

7. The method of claim 4, wherein the first channel state information report and the second channel state information report are transmitted periodically.

8. The method of claim 1, wherein transmitting comprises transmitting, by the wireless terminal, a representation of at least one of the first precoding matrix and the second precoding matrix over one of a Physical Uplink Shared Channel and a Physical Uplink Control Channel.

9. The method of claim 1, wherein the first codebook includes selection vectors, wherein each selection vector indicates one of a preferred channel state information reference signal from the first set of channel state information reference signals.

10. The method of claim 1, wherein transmitting comprises transmitting channel state information, where the channel state information includes both the first precoding matrix and the second precoding matrix.

11. The method of claim 1, wherein the first set of channel state information reference signals is different from the second set of channel state information reference signals.

12. The method of claim 1, wherein each channel state information reference signal of the first set of channel state information reference signals is associated with a corresponding channel state information reference signal antenna port, where each channel state information reference signal antenna port is representative of one or more vertically aligned antenna elements of a multi-column antenna array, and where each column in the multi-column antenna array comprises a plurality of antenna elements.

13. The method of claim 1,
wherein the first set of channel state information reference signals is same as the second set of channel state information reference signals, and
wherein determining the second precoding matrix includes determining the second precoding matrix based on the first precoding matrix and the second set of channel state information reference signals.

14. The method of claim 1, wherein receiving comprises receiving, at a wireless terminal, a configuration of the first set of channel state information reference signals and a configuration of the second set of channel state information reference signals, where the configuration of the first set of channel state information reference signals corresponds to the first set of channel state information reference signals and the configuration of the second set of channel state information reference signals corresponds to the second set of channel state information reference signals.

15. An apparatus comprising:
a receiver configured to receive a first set of channel state information reference signals on resource elements, and a second set of channel state information reference signals on resource elements;
a controller coupled to the receiver, the controller configured to determine a first precoding matrix based on the received first set of channel state information reference signals, where the first precoding matrix is chosen from a first codebook and configured to determine a second precoding matrix based on the second set of channel state information reference signals, where the second precoding matrix is chosen from a second codebook that is different than the first codebook; and
a transmitter coupled to the controller, the transmitter configured to transmit a representation of at least one of the first precoding matrix and the second precoding matrix;
wherein the second set of channel state information reference signals is based on the first precoding matrix.

16. The apparatus of claim 15, wherein the transmitter is configured to transmit a channel state information report including the representation of at least one of the first precoding matrix and second precoding matrix.

17. The apparatus of claim 16,
wherein the channel state information report further includes one or more of rank indication and channel quality indicator information for one or more spatial layers, and
wherein the channel quality indicator for one or more spatial layers is conditioned on the determined first precoding matrix and second precoding matrix.

18. The apparatus of claim 15, wherein the transmitter is configured to transmit a first channel state information report including at least the representation of the first precoding matrix in a first uplink subframe and a second channel state information report including at least the second precoding matrix in a second uplink subframe.

19. The apparatus of claim 18, wherein the first uplink subframe occurs at a different time from the second uplink subframe.

20. The apparatus of claim 19, wherein the first and second channel state information reports are transmitted with different periodicities.

21. The apparatus of claim 18, wherein the first channel state information report and the second channel state information report are transmitted periodically.

22. The apparatus of claim 15, wherein the transmitter is configured to transmit a representation of at least one of the first precoding matrix and the second precoding matrix over one of a Physical Uplink Shared Channel and a Physical Uplink Control Channel.

23. The apparatus of claim 15, wherein the first codebook includes selection vectors, wherein each selection vector indicates one of a preferred channel state information reference signal from the first set of channel state information reference signals.

24. The apparatus of claim 15, wherein the transmitter is configured to transmit channel state information, where the channel state information includes both the first precoding matrix and the second precoding matrix.

25. The apparatus of claim 15, wherein the first set of channel state information reference signals is different from the second set of channel state information reference signals.

26. The apparatus of claim 15, wherein each channel state information reference signal of the first set of channel state information reference signals is associated with a corresponding channel state information reference signal antenna port, where each channel state information reference signal antenna port is representative of one or more vertically aligned antenna elements of a multi-column antenna array, and where each column in the multi-column antenna array comprises a plurality of antenna elements.

27. The apparatus of claim 15,
wherein the first set of channel state information reference signals is same as the second set of channel state information reference signals, and
wherein the controller is configured to determine the second precoding matrix based on the first precoding matrix and the second set of channel state information reference signals.

28. The apparatus of claim 15, wherein the receiver is configured to receive a configuration of the first set of channel state information reference signals and a configuration of the second set of channel state information reference signals, where the configuration of the first set of channel state information reference signals corresponds to the first set of channel state information reference signals and the configuration of the second set of channel state information reference signals corresponds to the second set of channel state information reference signals.

* * * * *